(12) United States Patent  
Miller et al.

(10) Patent No.: US 12,443,094 B2
(45) Date of Patent: Oct. 14, 2025

(54) HANGING MOUNT FOR RECORDING DEVICES

(71) Applicant: Nexus Mount, LLC, Lake Charles, LA (US)

(72) Inventors: Brandon Lane Miller, Lake Charles, LA (US); Morgan Fontenot Miller, Lake Charles, LA (US)

(73) Assignee: Nexus Mount, LLC, Lake Charles, LA (US)

( * ) Notice: Subject to any disclaimer, the term of this patent is extended or adjusted under 35 U.S.C. 154(b) by 189 days.

(21) Appl. No.: 18/525,108

(22) Filed: Nov. 30, 2023

(65) Prior Publication Data

US 2025/0180968 A1 Jun. 5, 2025

(51) Int. Cl.
F16M 13/02 (2006.01)
G03B 17/56 (2021.01)

(52) U.S. Cl.
CPC ......... G03B 17/561 (2013.01); F16M 13/022 (2013.01)

(58) Field of Classification Search
CPC .............................. A63B 71/022; F16M 13/022
See application file for complete search history.

(56) References Cited

U.S. PATENT DOCUMENTS

| 3,833,196 | A | * | 9/1974 | Protzman | G03B 17/561 396/428 |
| 5,386,986 | A | * | 2/1995 | Gamboa | A63B 69/0079 473/430 |
| 5,538,212 | A | * | 7/1996 | Kennedy | F16M 13/022 396/428 |
| 6,053,340 | A | * | 4/2000 | Cameron | A63B 60/60 D6/552 |
| 7,331,881 | B2 | * | 2/2008 | Smith | A63B 63/083 473/481 |
| 8,152,389 | B1 | * | 4/2012 | Lammens | G03B 17/561 396/419 |
| 9,201,291 | B2 | * | 12/2015 | Jorgenson | G03B 17/561 |
| 9,649,547 | B2 | * | 5/2017 | White | A63B 71/0045 |
| 10,379,425 | B1 | * | 8/2019 | Kotin | F16M 13/022 |
| 10,413,800 | B1 | * | 9/2019 | Doran | F16M 13/022 |
| 2004/0069919 | A1 | * | 4/2004 | Studer | E04H 17/066 248/304 |

FOREIGN PATENT DOCUMENTS

WO WO-2021253108 A1 * 12/2021 ........... A47F 7/0028

OTHER PUBLICATIONS

Greer, Josh; LynkSpyder camera mount; [retrieved on Nov. 29, 2023]; Retrieved from the Internet: https://lynkspyder.com/products/lynkspyder-standard-model.

* cited by examiner

Primary Examiner — Leon W Rhodes, Jr.
(74) Attorney, Agent, or Firm — Jones Walker LLP

(57) ABSTRACT

In the realm of sports event recording and live streaming technology, the present invention introduces a device configured to mount onto chain-link or net fences at sporting venues. This device serves as a secure platform for various cameras, including smartphones and action cams, along with accompanying accessories such as batteries, hard drives, and cellular hotspots, offering an efficient solution for capturing high-quality video footage of games or practices. The device enhances the overall recording and streaming experience, addressing the limitations observed in existing methods and devices.

23 Claims, 22 Drawing Sheets

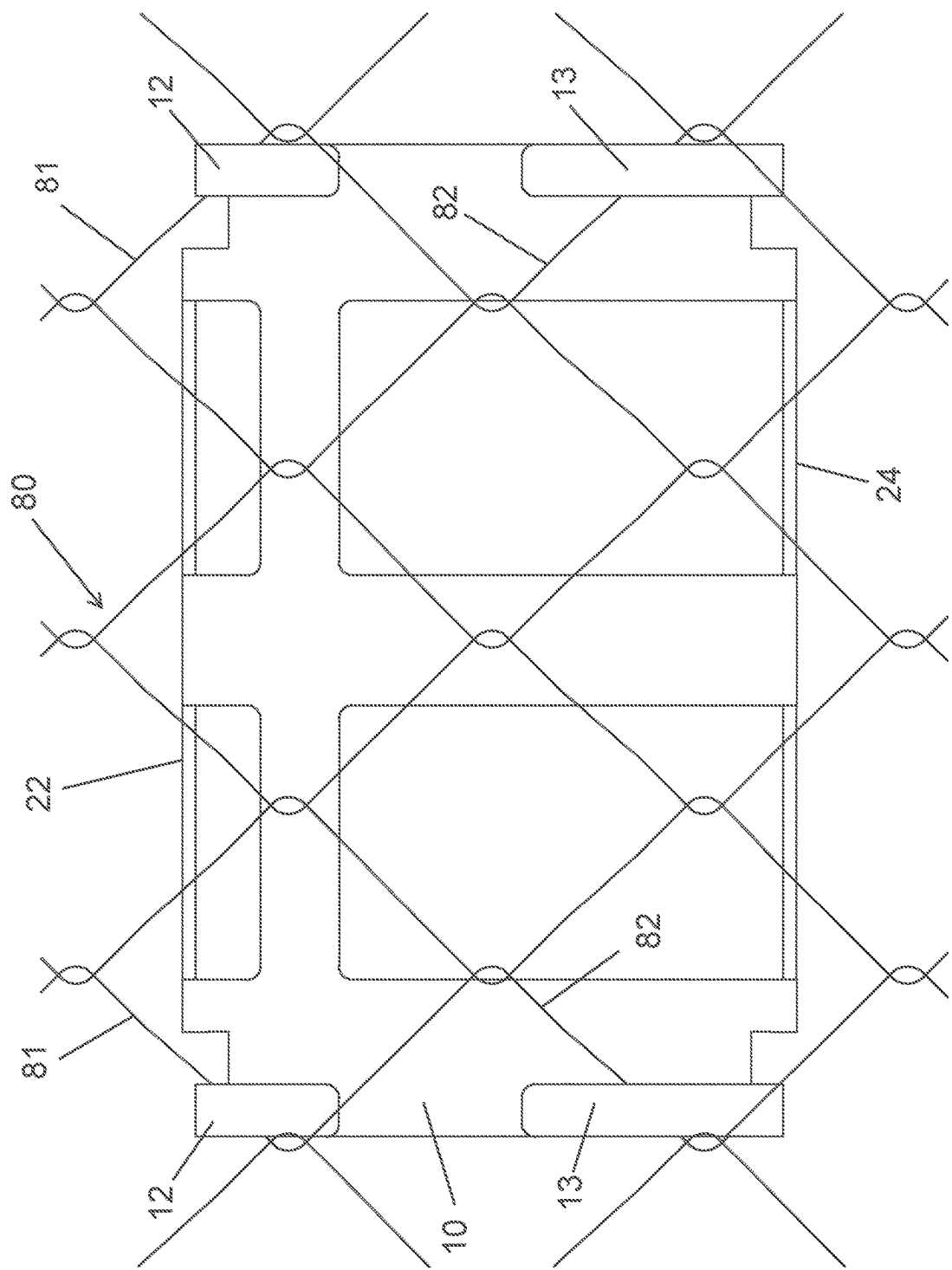

HANGING MOUNT FOR RECORDING DEVICES

BACKGROUND

In an age of social media, live streaming, and instant communication, recording and sharing our day-to-day lives has become ubiquitous. In recent years, there has been a growing demand for capturing and sharing live sports events and practices. Various devices have been developed to address this need, with cameras and recording equipment such as tripods commonly employed to document the action on the field. Traditional methods often involve the use of tripods or bulky camera installations that may impede the viewer's experience. Additionally, at sporting complexes that have a chain-link or net fence between the spectators and the athletes, the camera's view is obstructed, making it difficult to capture high quality footage.

In response, devices designed to mount a camera directly on the fence have been introduced; however, these devices suffer from several limitations. The current industry standard uses bulky steel constructions, posing challenges in terms of portability and ease of transport and restricting the adaptability of these devices in dynamic sporting environments. Furthermore, these devices allow for the mounting of only one device at a time without the purchase of additional accessories, restricting the ability to capture comprehensive footage from multiple perspectives, or to use recording accessories such as portable batteries, hard drives, or cellular hotspots.

The mounting process in existing devices involves several separate pieces that must be joined together by numerous screw fasteners, making them difficult and cumbersome to assemble. Further, the short hooks utilized for fence mounting in prior art devices increase the risk of accidental dislodgement, undermining the reliability of the recording setup. Additionally, the industry standard offers inadequate protection from sun exposure, leading to potential overheating of or water damage to recording devices during extended outdoor use. Thus, there remains a need for a lightweight, integrally formed mount that can easily and quickly attach to a chain-link or net fence, securely support multiple and different kinds of recording devices and accessories simultaneously, and protect the devices from the elements.

SUMMARY

The mounting device disclosed herein is configured to secure a recording device and recording accessories to a fence. Generally, the mounting device comprises a main frame having a top, a bottom, and a window therebetween; a first shelf protruding in a generally perpendicular forward direction from the bottom of the main frame; wherein the first shelf includes at least one slot having a width sufficient to allow the passage of a portion of a mounting accessory; and at least two hanging hooks protruding from the top of the main frame; wherein each hanging hook has a curved portion and a flat portion, the curved portion adjacent to the main frame and the flat portion extending from the curved portion, wherein a hanging space is defined between the flat portion of each hanging hook and a rear side of the main frame.

In another embodiment, the at least one slot is elongated and configured to allow the passage of a portion of two or more mounting accessories.

In another embodiment, the first shelf includes at least two rows of slots.

In some embodiments, the mounting device further comprises at least two stability hooks protruding from the bottom of the main frame, wherein each stability hook has a curved portion and a flat portion, the curved portion adjacent to the main frame and the flat portion extending from the curved portion, wherein a stability space is defined between the flat portion of each hanging hook and a rear side of the main frame, wherein a length of the flat portion of each stability hook is longer than a length of the flat portion of each hanging hook.

In certain embodiments, wherein the hanging hooks and the stability hooks are integrally formed with the main frame.

In some embodiments, the mounting device further comprises a second shelf protruding in a generally perpendicular forward direction from the top of the main frame; wherein the second shelf comprises at least one slot having a width sufficient to allow the passage of a mounting attachment. In certain embodiments, the second shelf is parallel to the first shelf. In other embodiments, the second shelf is perpendicular to the first shelf.

In certain embodiments, the mounting device further comprises curved tabs connecting the first shelf and the second shelf to the main frame.

In another embodiment, the first shelf, the second shelf, the hanging hooks, and the stability hooks are all integrally formed with the main frame.

In another embodiment, the main frame, the first shelf, the second shelf, the hanging hooks, and the stability hooks have a unitary one-piece construction.

In another embodiment, the unitary one-piece construction is manufactured from a single piece of powder-coated aluminum.

In some embodiments, the mounting device further comprises a removable cover configured for attachment to the second shelf with a mounting attachment engaged through the at least one slot of the second shelf.

In another embodiment, the mounting device further comprises at least one removable mounting accessory including a portion configured to be secured in one of the slots of the first shelf; wherein the at least one removable mounting accessory includes a clamp, a camera adapter, or a tripod adaptor.

In another embodiment, the main frame includes a central support bar.

BRIEF DESCRIPTION OF DRAWINGS

The accompanying figures, where like reference numerals refer to identical or functionally similar elements throughout the separate views, which are not true to scale, and which, together with the detailed description below, are incorporated in and form part of the specification, serve to illustrate further various exemplary embodiments and to explain various principles and advantages in accordance with the present invention:

FIG. 4B is a rear view of the mounting device of FIG. 1 mounted on a chain-link fence.

DETAILED DESCRIPTION

Figure 1:
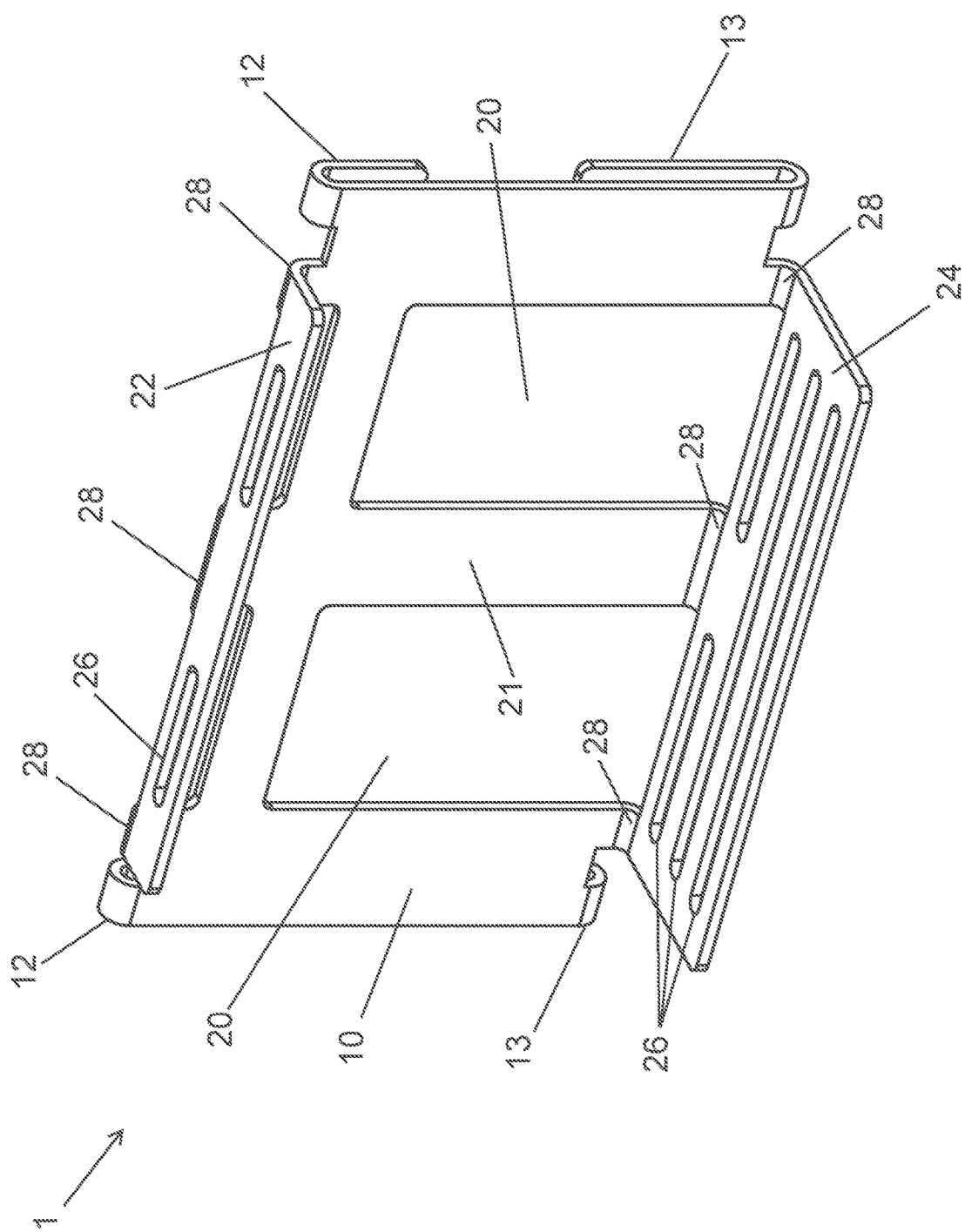
FIG. 1 is a front perspective view of a first embodiment of a mounting device of the present invention.

Detailed embodiments of the present invention are disclosed herein. However, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Alternate embodiments may be devised without departing from the spirit or the scope of the invention. Further, the terms and phrases used herein are not intended to be limiting, but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward.

As used herein, the terms "a" or "an" are defined as one or more. The term "plurality," as used herein, is defined as two or more. The term "another," as used herein, is defined as at least a second or more. The terms "comprises," "comprising," or any other variation thereof are intended to cover a non-exclusive inclusion, such that a process, method, article, or apparatus that comprises a list of elements does not include only those elements, but may include other elements not expressly listed or inherent to such process, method, article, or apparatus. An element proceeded by "comprises . . . a" does not, without more constraints, preclude the existence of additional identical elements in the process, method, article, or apparatus that comprises the element. The terms "including," "having," or "featuring," as used herein, are defined as comprising (i.e., open language). The term "coupled," as used herein, is defined as connected, although not necessarily directly, and not necessarily mechanically. As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. Relational terms such as first and second, upper and lower, top and bottom, right and left, and the like may be used solely to distinguish one entity or action from another entity or action without necessarily requiring or implying any actual such relationship or order between such entities or actions. "Vertical" or "vertical direction" as used herein means a direction that is generally parallel to Earth's gravitational force. "Horizontal" or "horizontal direction" as used herein means a direction that is generally perpendicular to Earth's gravitational force. As used herein, "generally perpendicular" means forming an angle of 90 degrees or forming an angle between 85 degrees and 95 degrees. As used herein, "curved" means having a surface with a non-uniform slope or a varying slope, including but not limited to surfaces including at least one semicircular surface, U-shaped surface, V-shaped surface, or corner. As used herein, "recording device" includes audio and/or visual recording devices and audio and/or visual streaming devices.

Disclosed herein is a mounting device configured to hold one or more recording devices or accessories and to be removably secured to a chain-link or net fence, such as at a sporting venue. The mounting device includes sets of hooks configured for mounting the device to a fence. The mounting device also includes at least one shelf with at least one slot configured to receive a portion of one or more mounting accessories for securing the mounting accessory to the shelf. These mounting accessories are configured to hold recording devices—such as phones, tablets, cameras, and video or action cameras—and other recording accessories—such as battery packs, hard drives, and hot spots. In addition, the mounting device may feature locations for attachment of a protective cover, and it may use an adapter accessory configured to secure the mounting device to a tripod when used in places where mounting on a fence is not an option. The mounting device's flexibility allows for the attachment of multiple mounting accessories at the same time in a multitude of configurations, providing a totally customizable experience depending on the needs of the user. Two embodiments of the mounting device of the present invention are illustrated in FIGS. 1-21, with many other variations and embodiments apparent to a skilled artisan after reviewing this disclosure.

Figure 2:
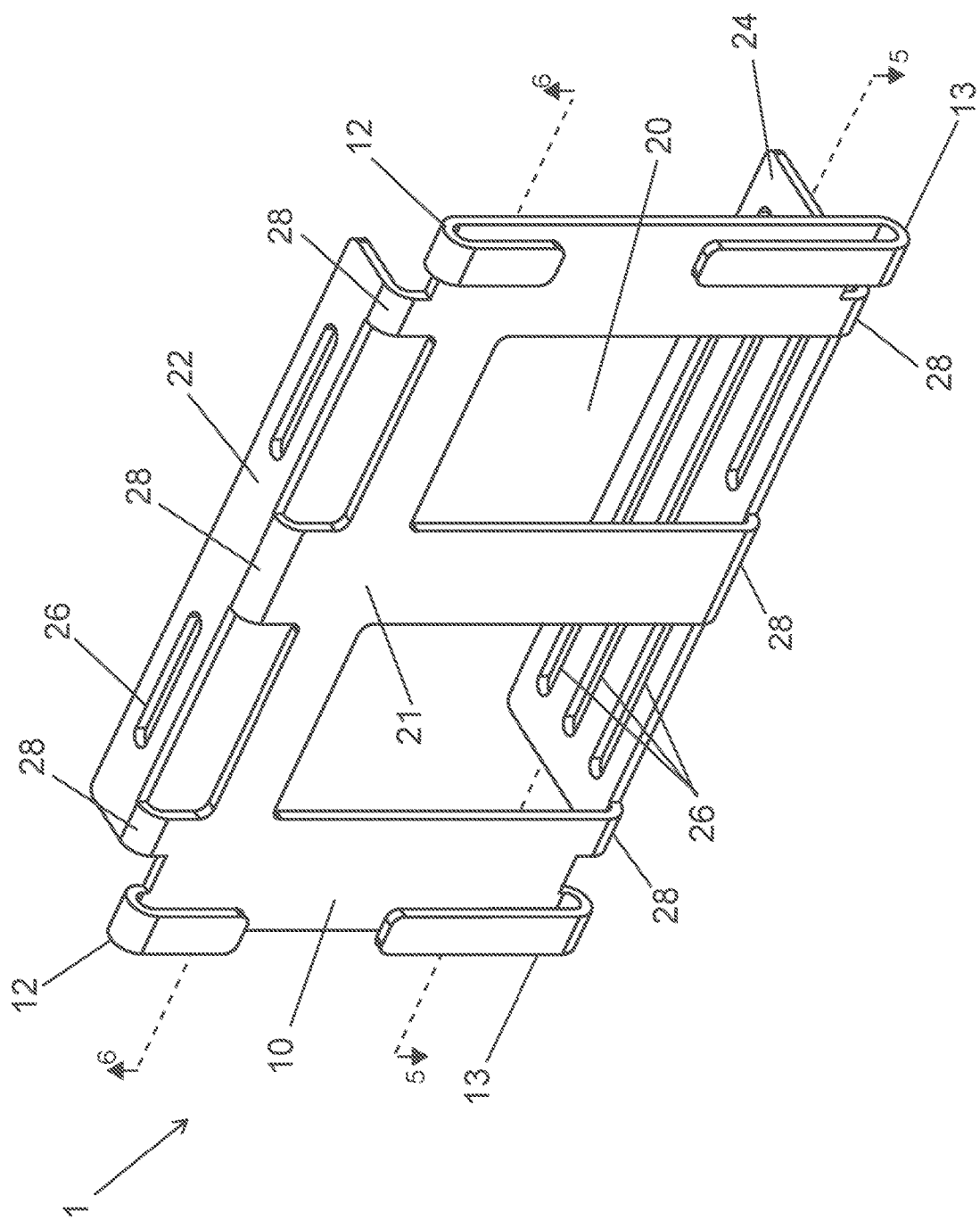
FIG. 2 is a rear perspective view of the mounting device of FIG. 1.

FIGS. 1-14 illustrate a first embodiment of the mounting device disclosed herein. As shown in FIGS. 1-2, mounting device 1 comprises a main frame 10 that serves as the central framework for the device; two shelves—optional top shelf 22 and bottom shelf 24—that serve as attachment surfaces for mounting accessories and other components; and four hooks-two hanging hooks 12 and two stability hooks 13—that allow mounting device 1 to be removably secured to a chain-link or net fence. The main frame 10 may have a generally rectangular shape with one or more windows 20 that provide unobstructed spaces in main frame 10. Windows 20 allow unobstructed filming when a camera's lens is pointed in a rearward direction toward a fence. Optionally, the main frame 10 may also have a support bar 21 to provide additional stability and strength to the design. In the illustrated embodiment, support bar 21 is a t-shaped central bar. In other embodiments, support structures of various shapes may be used to reinforce main frame 10.

Figure 3:
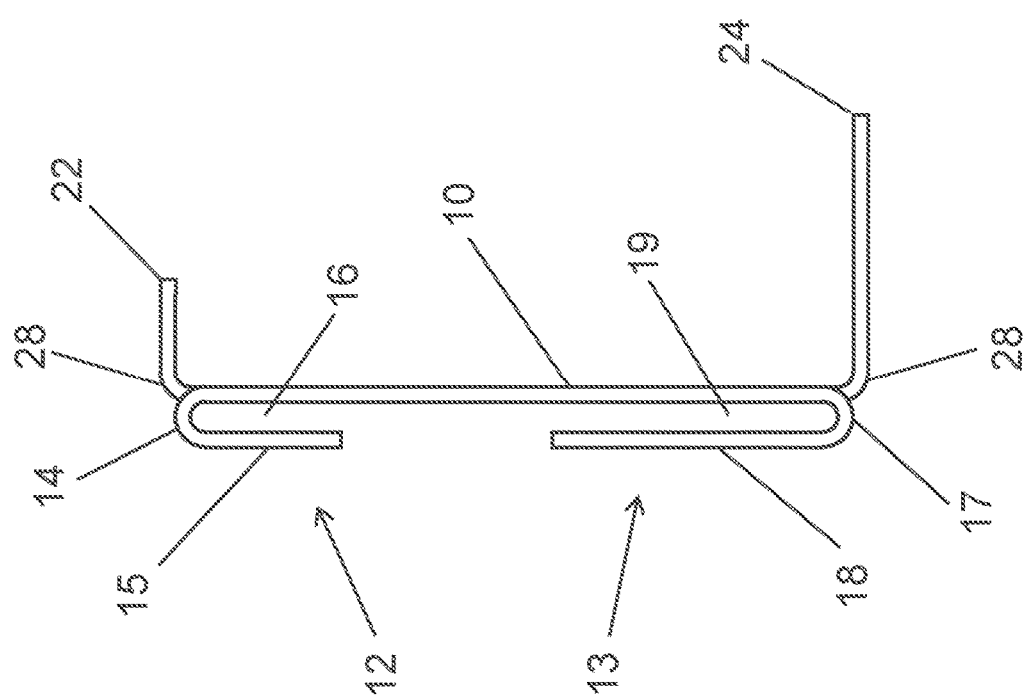
FIG. 3 is a side view of the mounting device of FIG. 1.

Viewing FIG. 2, hanging hooks 12 and stability hooks 13 are located on the corners of the rear side of the mounting device 1. While the illustrated embodiment includes two hanging hooks and two stability hooks, other embodiments of the mounting device disclosed herein include more than two hanging hooks and/or more than two stability hooks. Each hanging hook 12 protrudes from the top of main frame 10 and points downward, while each stability hook 13 protrudes from the bottom of main frame 10 and points upward. As shown in FIG. 3, hanging hook 12 includes a flat portion 15 and a curved portion 14 that connects the flat portion 15 to the main frame 10. In this way, curved portion 14 is adjacent to main frame 10 with flat portion 15 extending from curved portion 14. Curved portions 14 may have any shape configured to orient flat portions 15 at an angle of 30 degrees or less relative to main frame 10, preferably an angle of 20 degrees or less. In the illustrated embodiment, curved portions 14 orient flat portions 15 at an angle of 5 degrees or less relative to main frame 10 such that flat portions 15 are generally parallel to main frame 10. A hanging space 16 is defined between the flat portion 15 of each hanging hook 12 and the main frame 10. Hanging spaces 16 are configured to receive fence rungs to allow the mounting device 1 to hang from a fence when it is mounted, as shown in FIGS. 4A and 4B.

FIG. 3 also shows that each stability hook 13 includes a flat portion 18 and a curved portion 17 that connects the flat portion 18 to the main frame 10. In this way, curved portion 17 is adjacent to main frame 10 with flat portion 18 extending from curved portion 17. Curved portions 17 may have any shape configured to orient flat portions 18 at an angle of 30 degrees or less relative to main frame 10, preferably an angle of 20 degrees or less. In the illustrated embodiment, curved portions 17 orient flat portions 18 at an angle of 5 degrees or less relative to main frame 10 such that flat portions 18 are generally parallel to main frame 10. A stability space 19 is defined between the flat portion 18 of each stability hook 13 and the main frame 10. Stability spaces 19 are configured to receive fence rungs to reduce or prevent horizontal movement of mounting device 1 from wind or other forces when it is mounted, as shown in FIGS. 4A and 4B.

As shown in FIGS. 1-3, the flat portions 15 of hanging hooks 12 and flat portions 18 of stability hooks 13 are all elongated members. A length of the flat portion 15 of each hanging hook 12 is longer than a length of the flat portion 18 of each stability hook 13—in some embodiments approximately two times longer. In a preferred embodiment, hanging hooks 12 are approximately 1.25 inches long, and stability hooks 13 are approximately 2.5 inches long. In the illustrated embodiment, each hanging hook 12 and each stability hook 13 is integrally formed with the main frame 10.

Figure 4A:
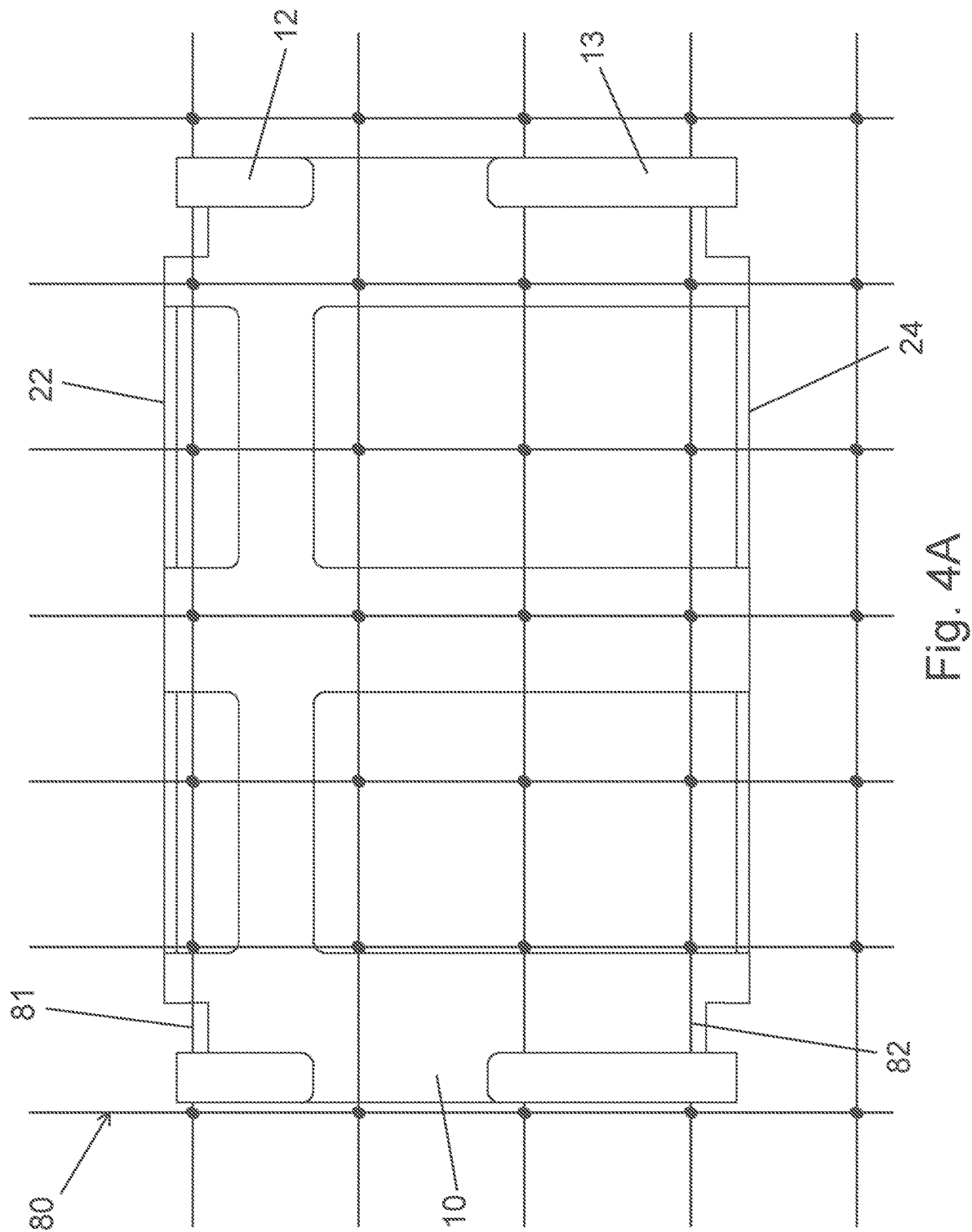
FIG. 4A is a rear view of the mounting device of FIG. 1 mounted on a net fence.

With reference to FIGS. 4A and 4B, to mount the device 1 on a chain-link or net fence 80, a user positions the rear side of the device 1 against the fence 80 with the top of the device 1 tilted slightly toward the user and positions a target lower fence rung 82 in the stability spaces 19 between the main frame 10 and the flat portions 18 of the stability hooks 13. Then, the user slides the device 1 upwards until the lower fence rung 82 meets the curved portions 17 of the stability hooks 13. In embodiments in which the mounting device 1 is made from a thin, lightweight material, the user is able to flex the stability hooks 13 away from the main frame 10 if necessary to fit the hooks 13 around the fence rung 82. Next, the user tilts the top of the device 1 toward the fence 80 so that it is parallel with the fence 80 and the hanging hooks 12 are above a target upper fence rung 81 and in position to receive the upper fence rung 81 in the hanging spaces 16 between the main frame 10 and the flat portions 15 of the hanging hooks 12. Then, the user slides the device 1 downwards until the upper fence rung 81 meets the curved portions 14 of the hanging hooks 12. Because the flat portions 18 of the stability hooks 13 are longer than the flat portions 15 of the hanging hooks 12, the device 1 can slide up high enough during installation so that the hanging hooks 12 can be easily placed into position above the target upper fence rung 81. Once the device 1 is lowered into position with the upper fence rung 81 engaging curved portions 14 of hanging hooks 12, the longer length of the flat portions 18 of the stability hooks 13 ensures (or increases the likelihood) that the lower fence rung 82 is still positioned within stability spaces 19 between the main frame 10 and the flat portions 18 of the stability hooks 13. The elongated shape of flat portions 15 and 18 of hanging hooks 12 and stability hooks 14 prevents mounting device 1 from easily slipping off of the fence 80 in the event of an impact to the fence, such as an impact created by a ball hitting the fence 80. In these ways, hanging hooks 12 and stability hooks 13 provide important advantages over conventional mounting devices.

Figure 5:
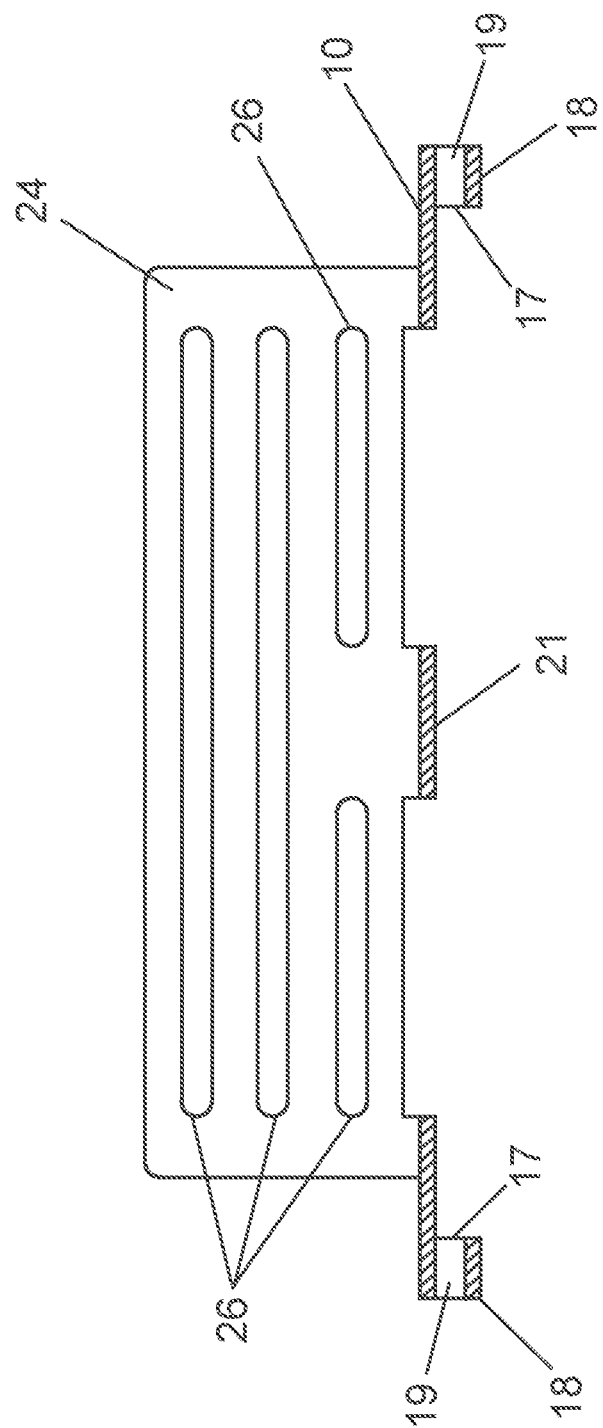
FIG. 5 is a sectional view of the mounting device taken along line 5-5 in FIG. 2.
Figure 6:
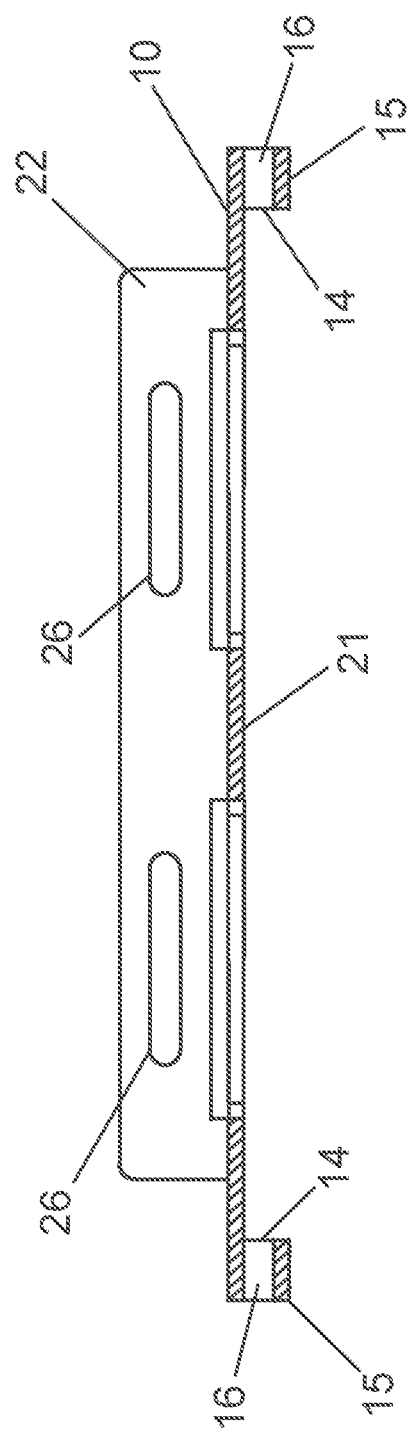
FIG. 6 is a sectional view of the mounting device taken along line 6-6 in FIG. 2.
Figure 7:
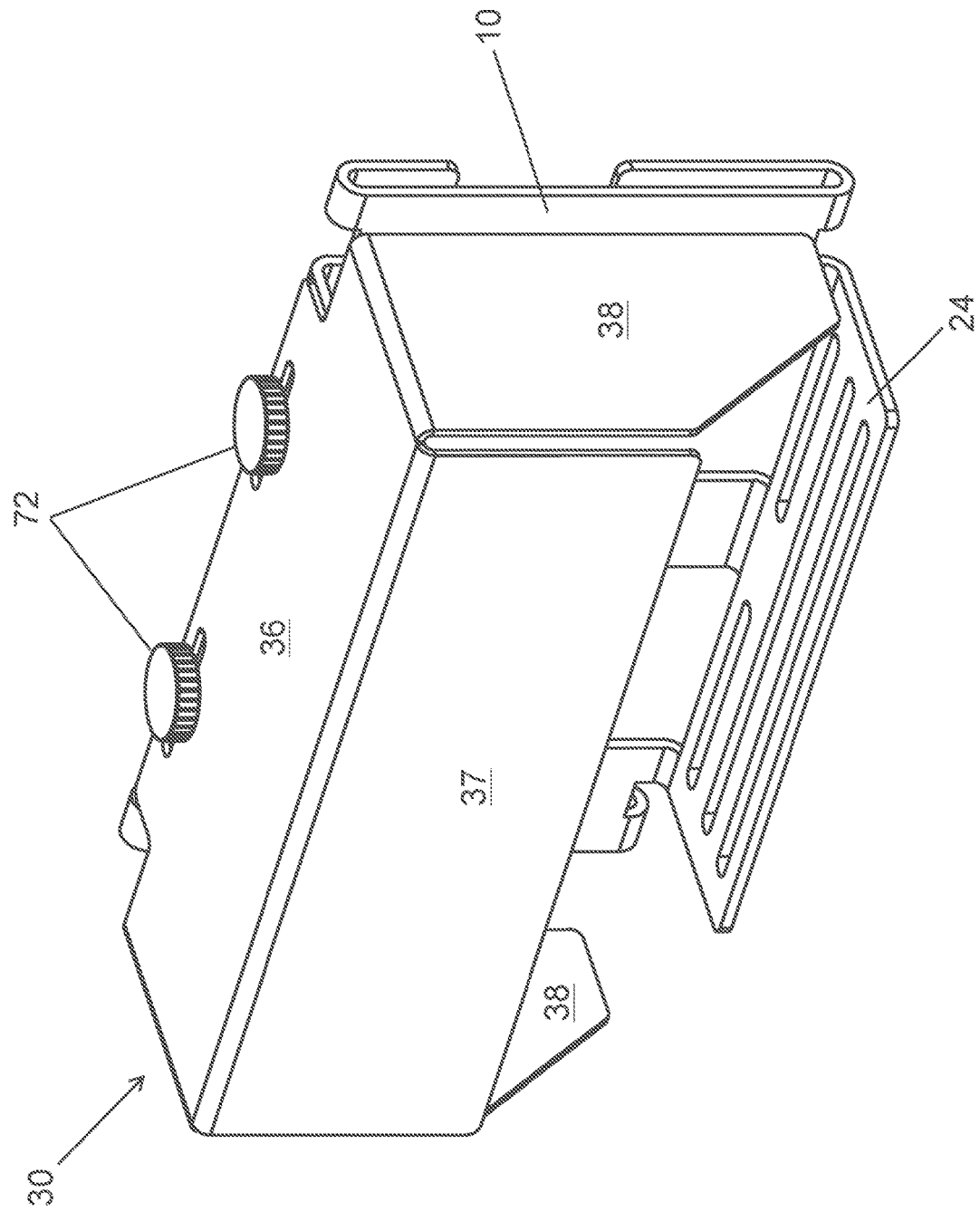
FIG. 7 is a front perspective view of the mounting device of FIG. 1 with a removable protective cover attached thereto.
Figure 8:
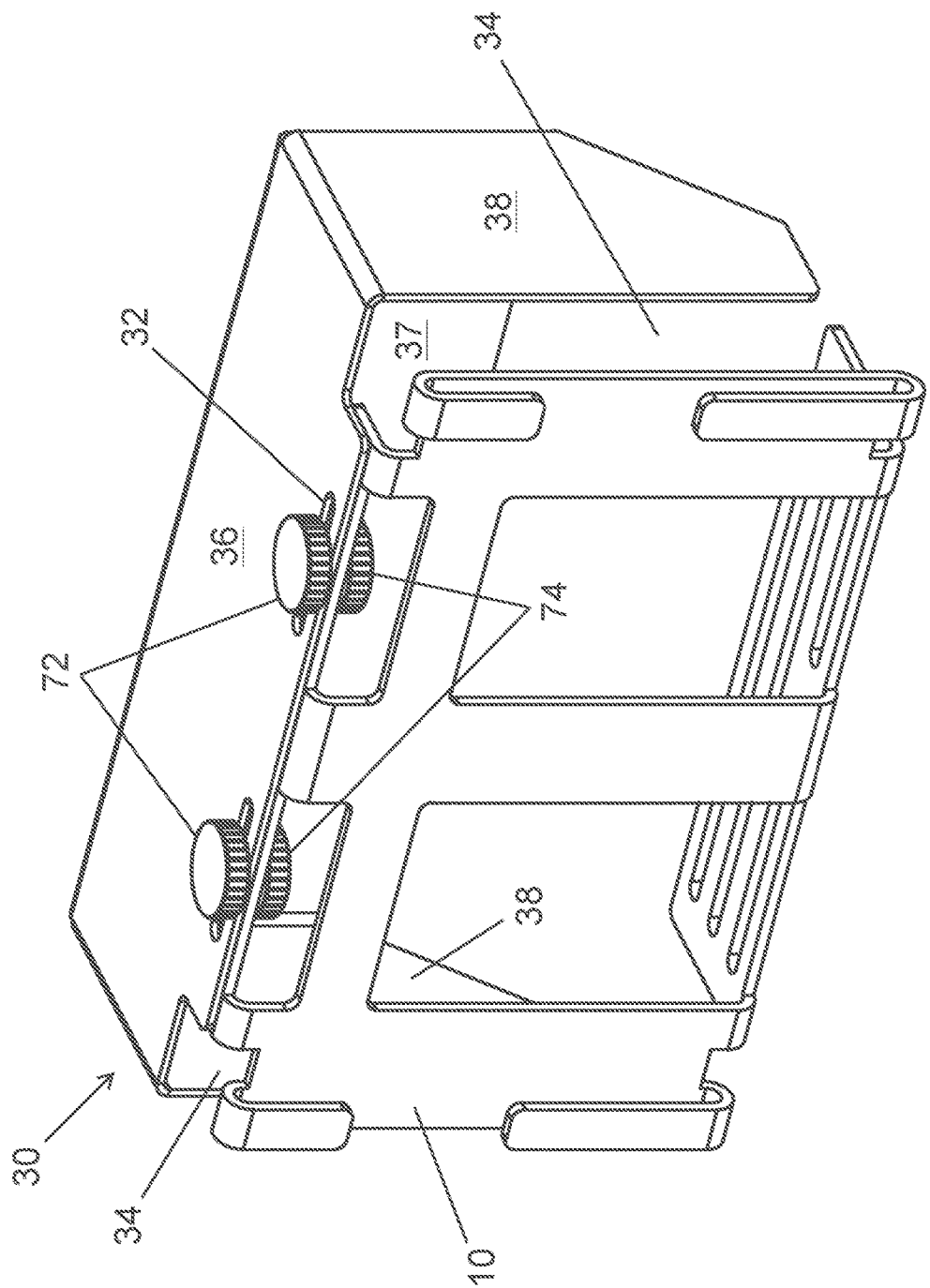
FIG. 8 is a rear perspective view of the mounting device and the removable protective cover of FIG. 7.

Returning to FIGS. 1-2, shelves 22, 24 protrude from main frame 10 in a generally perpendicular forward direction. In this way, shelves 22, 24 are disposed on an opposite side of the main frame 10 from the hooks 12, 13. Each shelf 22, 24 is connected to main frame 10 by curved tabs 28, which are curved to orient shelves 22, 24 in a generally perpendicular direction relative to main frame 10. In the illustrated embodiment, multiple spaced-apart curved tabs 28 connect each shelf 22, 24 to main frame 10. In the embodiment pictured in FIGS. 1-14, bottom shelf 24 is wider (i.e., protrudes further from main frame 10) than top shelf 22, but in other embodiments the two shelves may be the same size or top shelf 22 may be wider. Each shelf 22, 24 includes at least one slot 26 to which mounting device accessories may attach. Each slot 26 is elongated in a direction that is generally parallel to the main frame 10. As is best seen in FIG. 5, bottom shelf 24 may comprise multiple rows of slots 26. The illustrated embodiment comprises three rows of slots 26, where the row closest to the main frame 10 may be divided into two slots 26—the solid portion therebetween enhancing the strength of bottom shelf 24 and/or the mounting device 1 overall. Turning to FIG. 6, top shelf 22 comprises one row of slots 26, also divided into two sections. However, it is to be understood that the shelves 22, 24 in other embodiments may comprise more or fewer rows of slots 26. In addition, some embodiments of the mounting device 1 may not include a top shelf 22 at all, as will be seen in the description of the second embodiment of the present invention, mounting device 100.

In the illustrated embodiment, shelves 22 and 24, hanging hooks 12, and stability hooks 13 are integrally formed with the main frame 10. For example, main frame 10, shelves 22 and 24, hanging hooks 12, and stability hooks 13 may have unitary one-piece construction. In some embodiments, main frame 10, shelves 22 and 24, hanging hooks 12 and stability hooks 13 may be manufactured from a single piece of aluminum, and in certain embodiments a powder-coated aluminum material may be used. The powder coating makes device 1 less conductive of heat, which is beneficial when the device sits in the sun for long periods of time. The aluminum is lightweight, as opposed to conventional mounting devices fabricated from steel. As a result, these embodiments of mounting device 1 are easier to transport and cause less weight strain when hanging from net fences. In other embodiments, shelves 22 and 24, hanging hooks 12, and stability hooks 13 may be integrally formed with the main frame 10 via a permanent attachment during the manufacturing process. For example, device 1 may be manufactured using a molding, casting, extrusion, additive, 3D printing, or welding process or any other process or combination of processes by which shelves 22 and 24, hanging hooks 12, and stability hooks 13 are permanently attached to main frame 10. The integral construction of the shelves and hooks of mounting device 1 provides a more compact design than conventional mounting devices. The integral construction also provides a quicker and more streamlined process for attaching mounting device 1 to a fence than with conventional mounting devices.

Another significant drawback of the prior art is that the recording devices must remain exposed in the hot sun for long periods of time when filming or live streaming entire sporting events or practices, often causing recording devices to overheat and shut down. To resolve this problem, the mounting device 1 of the present invention optionally includes a removable protective cover 30. FIGS. 7-10 show mounting device 1 with protective cover 30 attached. While the embodiment of protective cover 30 pictured is not configured to provide rain protection, other embodiments may include this feature. Viewing FIGS. 7-8, protective cover 30 comprises a top 36, a front 37, and two sides 38 to protect recording devices on all sides except the direction of recordation. The top 36 of protective cover 30 comprises slots 32 (best viewed in FIG. 9), which may align with slots 26 of top shelf 22 for attachment of protective cover 30 to top shelf 22 by the engagement of a mounting attachment through aligned slots 26 and 32 (best viewed in FIG. 8). The mounting attachment may include thumb screw 72 and thumb nut 74 secured to aligned slots 26 and 32 as a skilled artisan will readily understand from this disclosure. In the illustrated embodiment, front 37 of protective cover 30 is shorter than sides 38 (best viewed in FIG. 7), thereby leaving a space for a user to access and/or adjust a device secured to bottom shelf 24 below protective cover 30. Additionally, in some embodiments, the openings between tabs 28 may be large enough to allow the user to access the thumb screw 72 or nut 74 attached to top shelf 22 in order to secure protective cover 30 (or any other device) to top shelf 22 (best viewed in FIG. 8).

Figure 9:
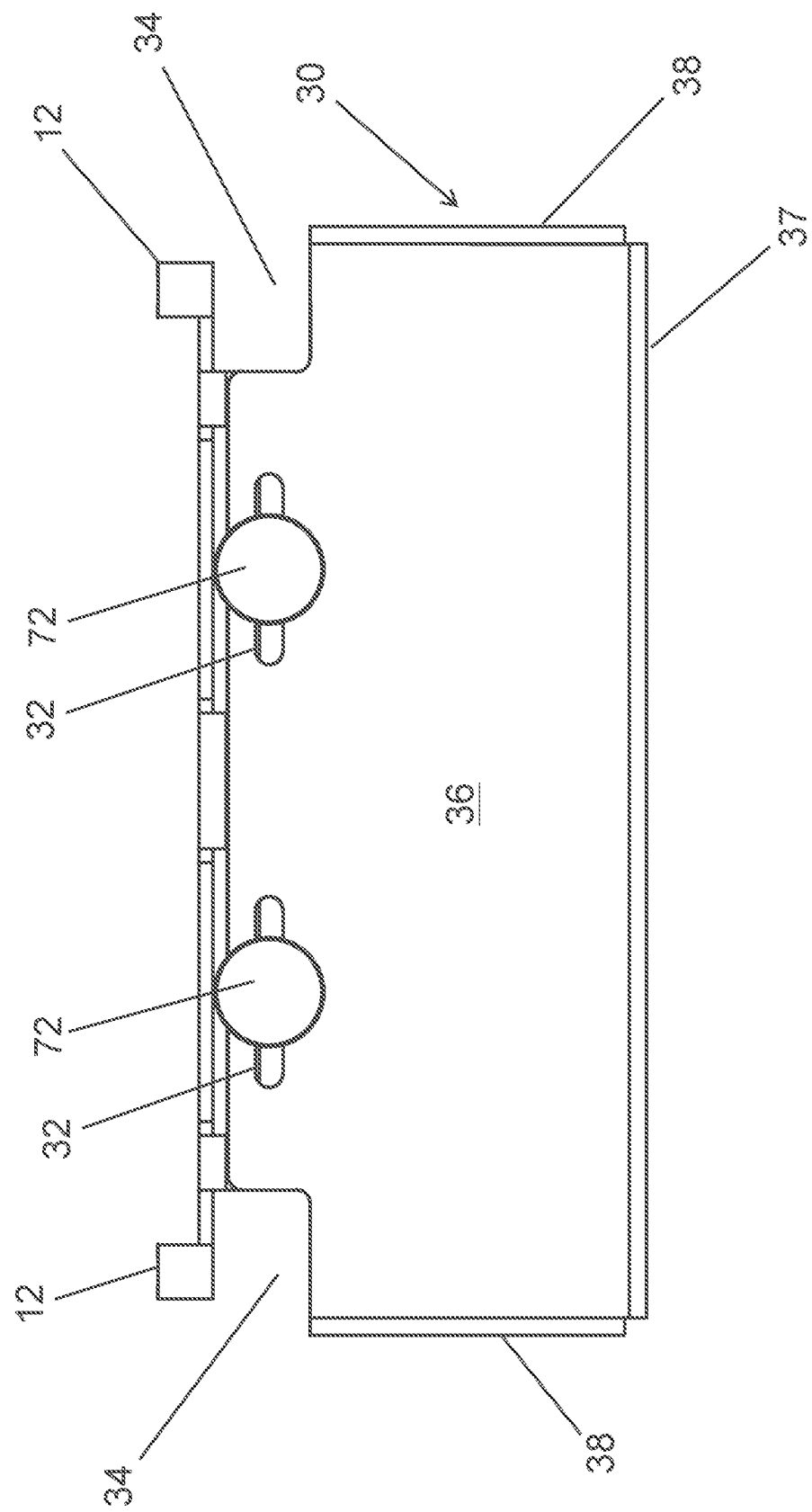
FIG. 9 is a top view of the mounting device and the removable protective cover of FIG. 7.
Figure 10:
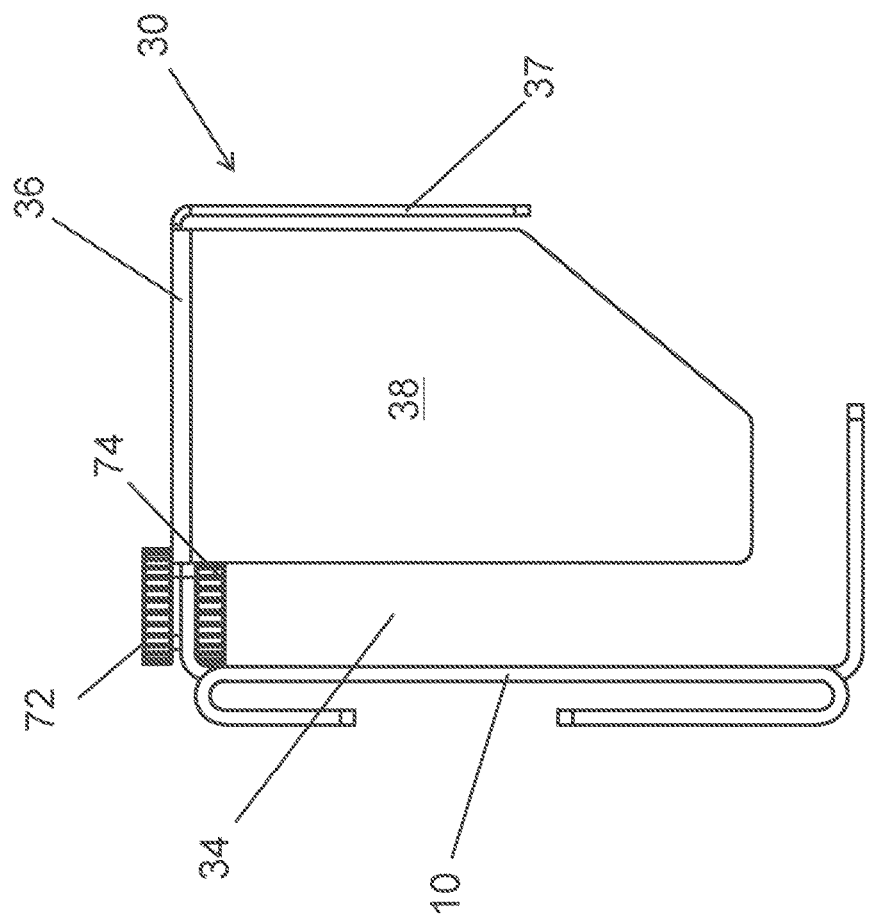
FIG. 10 is a side view of the mounting device and the removable protective cover of FIG. 7.
Figure 11:
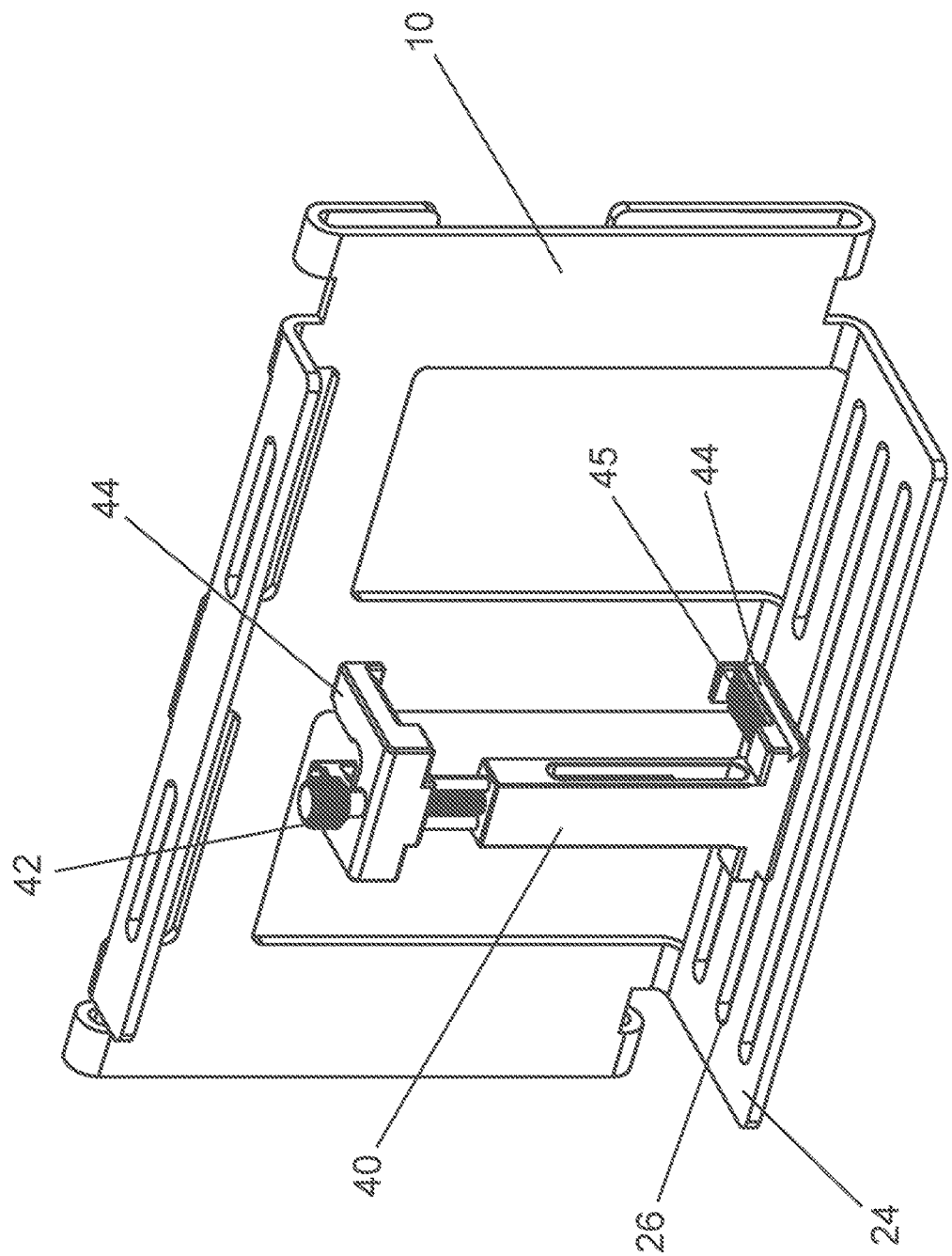
FIG. 11 is a front perspective view of a mounting clamp attached to the mounting device of FIG. 1.

Turning to FIGS. 9-10, top 36 and sides 38 of protective cover 30 are configured to define a recess 34 between each side 38 and main frame 10 when protective cover 30 is attached to main frame 10. Recess 34 provides a space for cords, wires, or other connections attached to the side of a recording device secured to bottom shelf 24. For example, a cell phone secured to bottom shelf 24 may have a charging cord connected thereto that extends in a direction toward one of sides 38 of protective cover 30, and the charging cord may extend through recess 34. In the illustrated embodiment, a recess 34 extends the entire length of each side 38 of the protective cover 30 and extends partially inward along the top of main frame 10 (as shown in FIG. 9). Alternatively, recess 34 may extend along only a portion of the length of side 38 and/or may not extend inward along the top of main frame 10.

FIGS. 11-14 illustrate exemplary configurations of mounting accessories that can be used to attach various recording and support devices to the mounting device 1. Each mounting accessory in the attached figures comprises a threaded bore at its base, which engages with a thumb screw 72 through slots 26 in either the top shelf 22 or bottom shelf 24. Neoprene rubber washers between the shelves and the thumb screws reduce vibrations that a metal-to-metal joint would otherwise transfer to the camera. However, it should be understood that the present invention is not limited to using thumb screws for accessory attachment. In other embodiments, magnets, hook and loop connector material, or any other suitable method for removable attachment may be used. In addition, one skilled in the art will readily acknowledge that any mounting accessory currently known or developed in the future can be used with mounting device 1. One such mounting accessory is the mounting clamp 40 shown in FIG. 11, which can be used to hold a cell phone, a portable battery, hard drive, or cellular hotspot, or any other device that can fit between the clamping feet 44. The height of mounting clamp 40 may be adjusted using adjustment screw 42, and feet 44 use high friction pads 45 to hold devices in place. The depth of the feet 44 also allow for phones to be tilted downward without the need for a ball head mount. Additionally, the mounting clamp 40 may be installed backwards on the mounting device 1 so the user can look at a phone screen and record in selfie mode. In other embodiments, a larger mounting clamp 40 may be used to accommodate tablets or other large devices.

Figure 12:
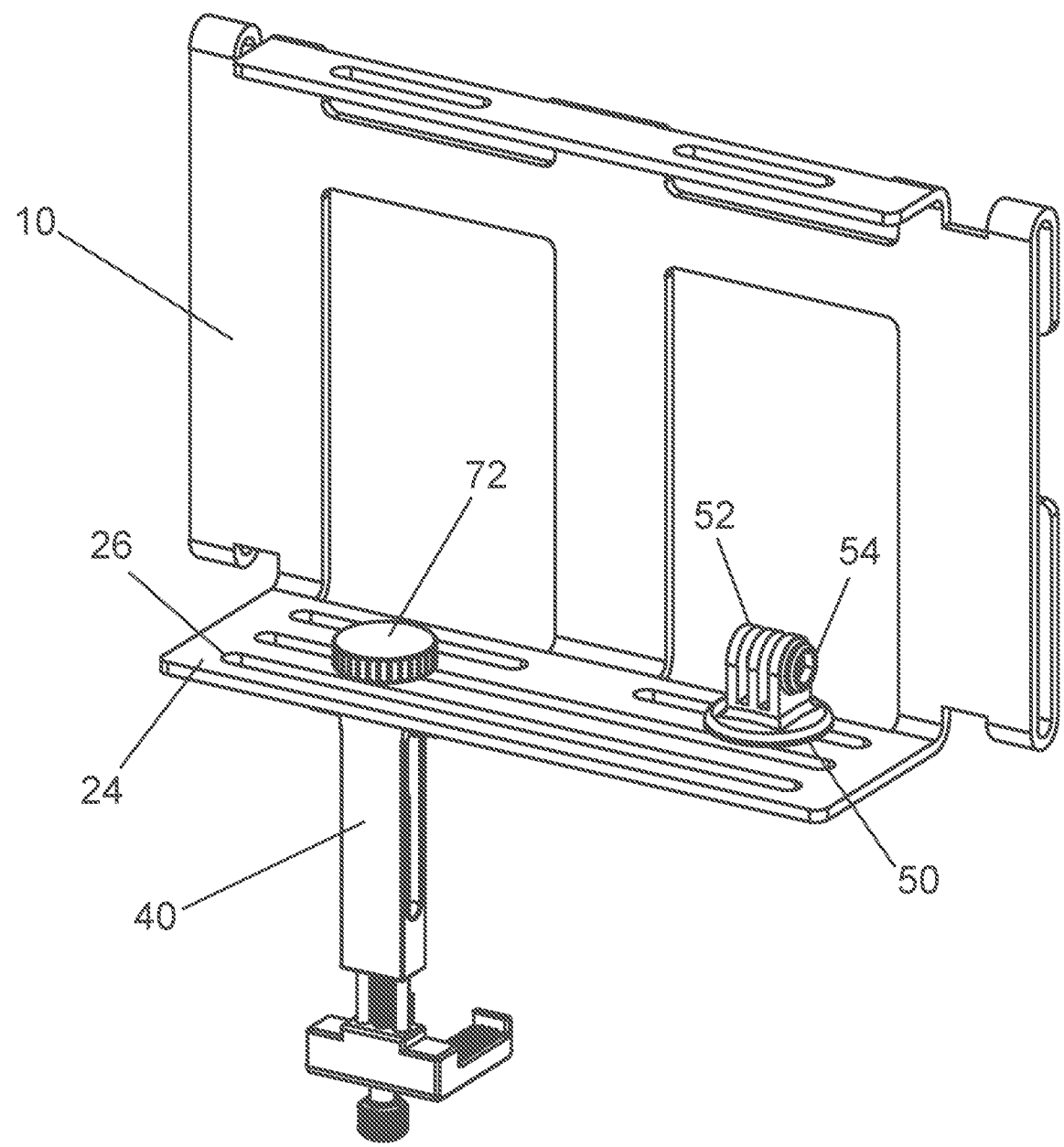
FIG. 12 is a front perspective view of a mounting clamp and an action-cam adapter attached to the mounting device of FIG. 1.
Figure 13:
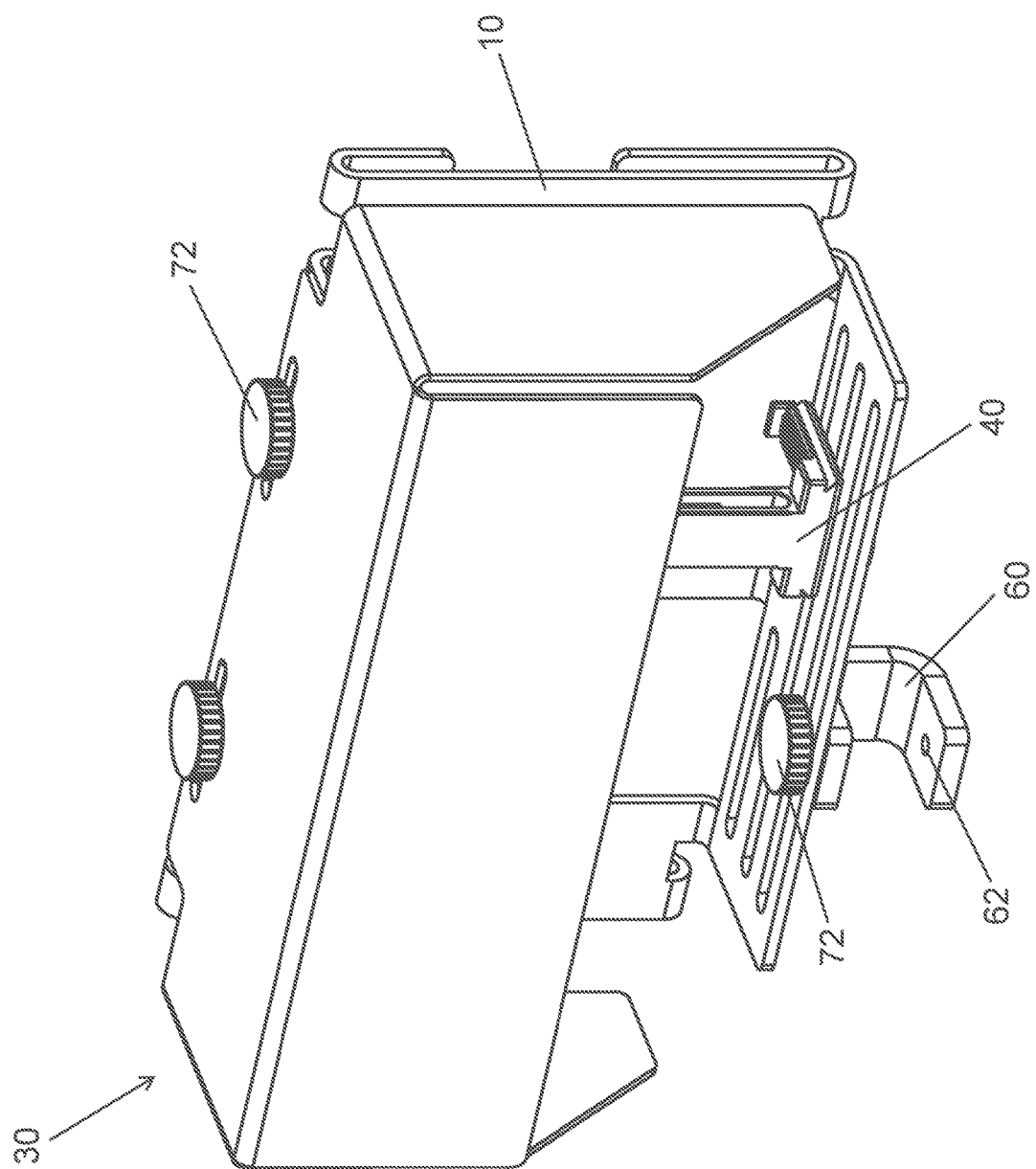
FIG. 13 is a front perspective view of a mounting clamp, a tripod adapter, and a removable protective cover attached to the mounting device of FIG. 1.
Figure 14:
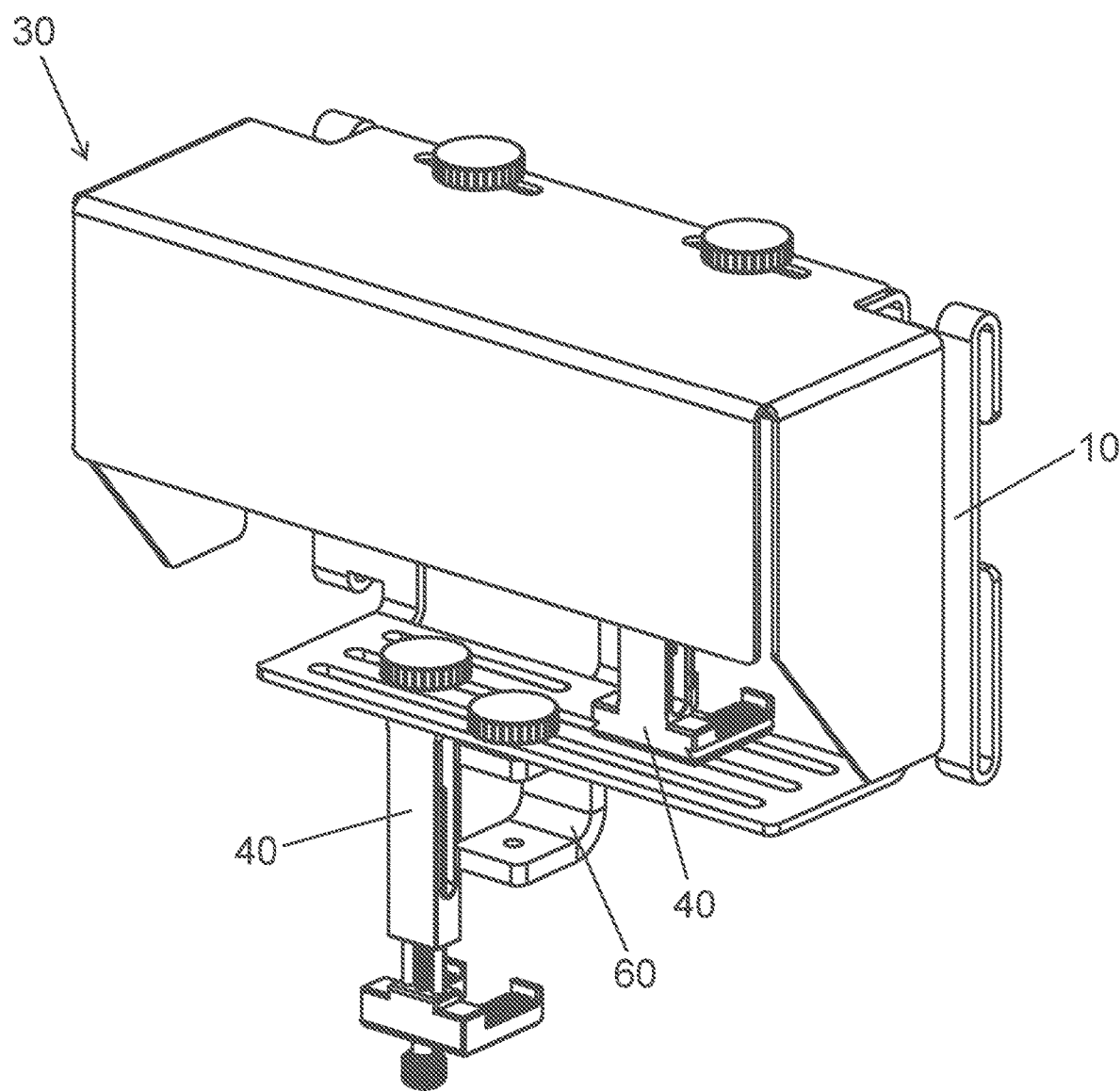
FIG. 14 is a front perspective view of two mounting clamps, a tripod adapter, and a removable protective cover attached to the mounting device of FIG. 1.
Figure 15:
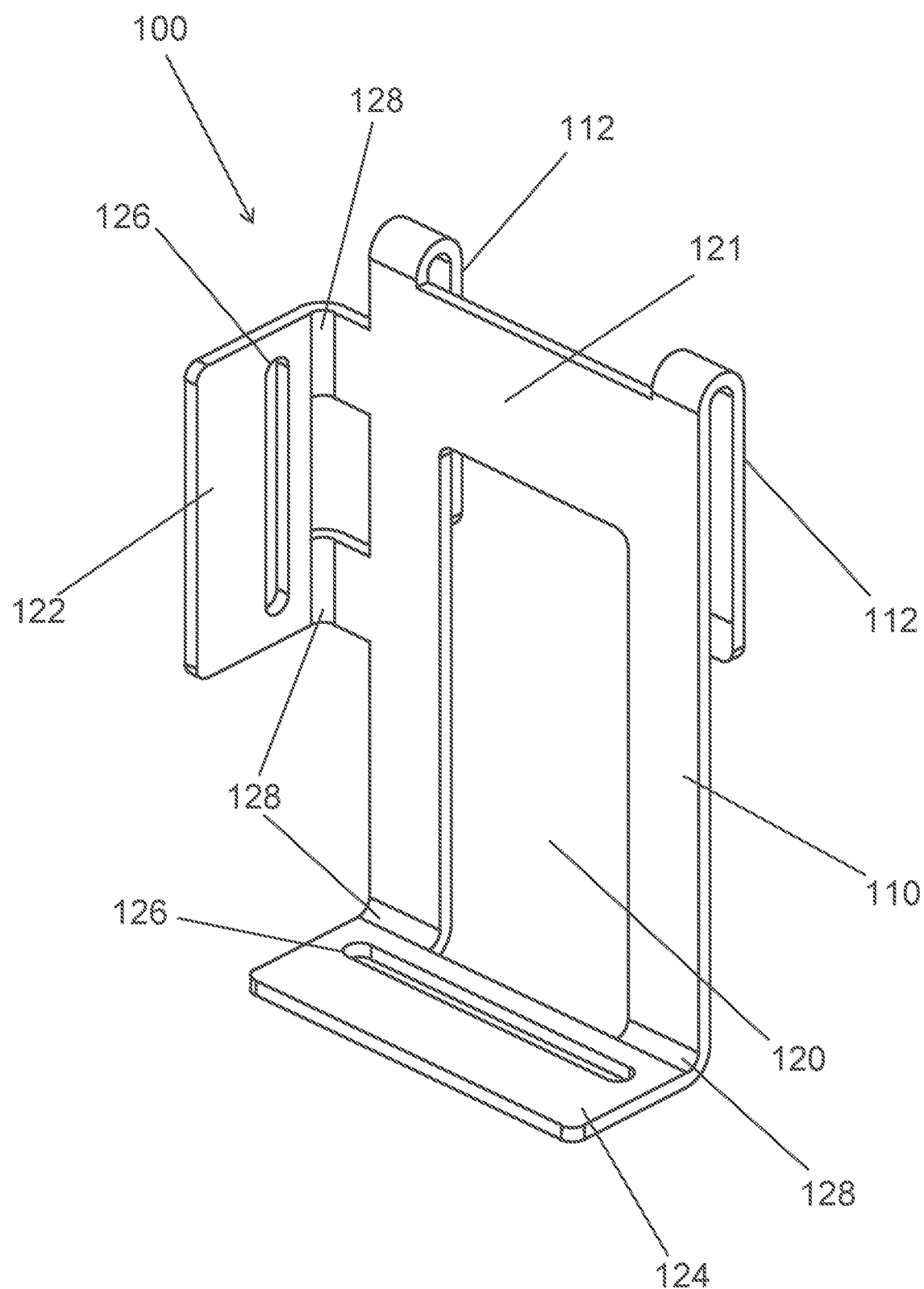
FIG. 15 is a front perspective view of a second embodiment of a mounting device of the present invention.

Unlike prior art fence-mounting devices, which only allow the attachment of one recording device, FIGS. 12-14 illustrate that the number and length of slots 26 in shelves 22, 24 allow the user to attach multiple mounting accessories to mounting device 1 at the same time, in any number of different and useful configurations. FIG. 12 also depicts action-cam adapter 50, which allows the user to record using an action cam, such as a GoPro®. Action-cam adapter 50 comprises three vertical leaves 52, between which two corresponding leaves of an action-cam case may be inserted. All of the leaves 52 have an aperture 54, though which a screw and nut may engage to secure the action cam in place. In the configuration shown in FIG. 12, clamp 40 may for example hold a portable battery to charge the action cam while it remains mounted to action-cam adapter 50. Clamp 40 is installed upside down so that the portable battery does not block the camera while recording. In other configurations, the user could attach two clamps 40 underneath bottom shelf 24 to hold both a portable battery and a cellular hotspot, or any other useful accessories, or the user could record with a phone instead of the action cam by replacing action-cam adapter 50 with clamp 40.

A third exemplary mounting accessory is depicted in FIG. 13. Tripod adapter 60 allows mounting device 1 to be connected to a tripod when mounting to a net or chain-link fence is not an option. Tripod adapter 60 is a C-shaped bracket that comprises a threaded hole 62 in the bottom to allow tripod adapter 60 to be attached to a tripod using a screw. FIGS. 13-14 also illustrate that protective cover 30 can be used at the same time as the mounting accessories. In addition, FIG. 14 shows an exemplary configuration in which three mounting accessories are attached at once-two clamps 40 and one tripod adapter 60. One skilled in the art will recognize that the slots 26 of the top shelf 22 and bottom shelf 24 allow the mounting device 1 to be used in many different configurations and that the arrangements outlined above are merely demonstrative of the multi-functional capabilities of the mounting device 1. For example, although not pictured, any mounting accessory could be installed at an angle so that the user is not limited to recording in a direction perpendicular to the fence. In another example, thumb screw 72 could be used alone to mount a recording device that has its own threaded bore, such as a Logitech® Mevo®.

Referring now to FIGS. 15-21, a second embodiment of the mounting device of the present invention is shown. Mounting device 100 is smaller and lighter for easier transport and set up. Mounting device 100 comprises a main frame 110, which may have a generally rectangular shape. The main frame 110 is reinforced by crossbar 121, which in the depicted embodiment is a horizontal bar across the top of main frame 110, but in other embodiments could take on any shape in any position that would provide strength and support to the design. Main frame 110 includes a one or more windows 120 through which an attached recording device may film if it is aimed toward the fence.

Figure 16:
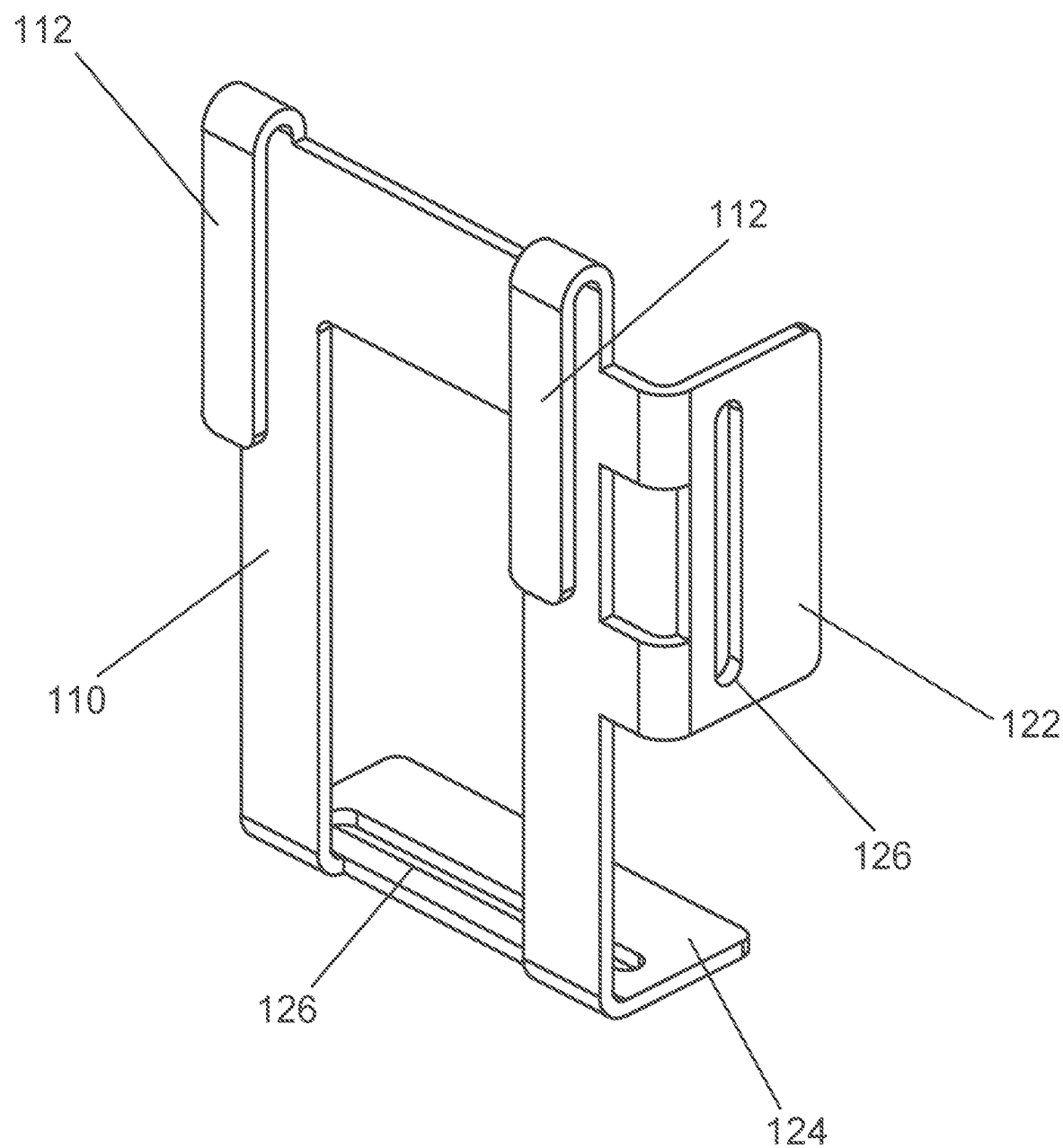
FIG. 16 is a rear perspective view of the mounting device of FIG. 15.
Figure 17:
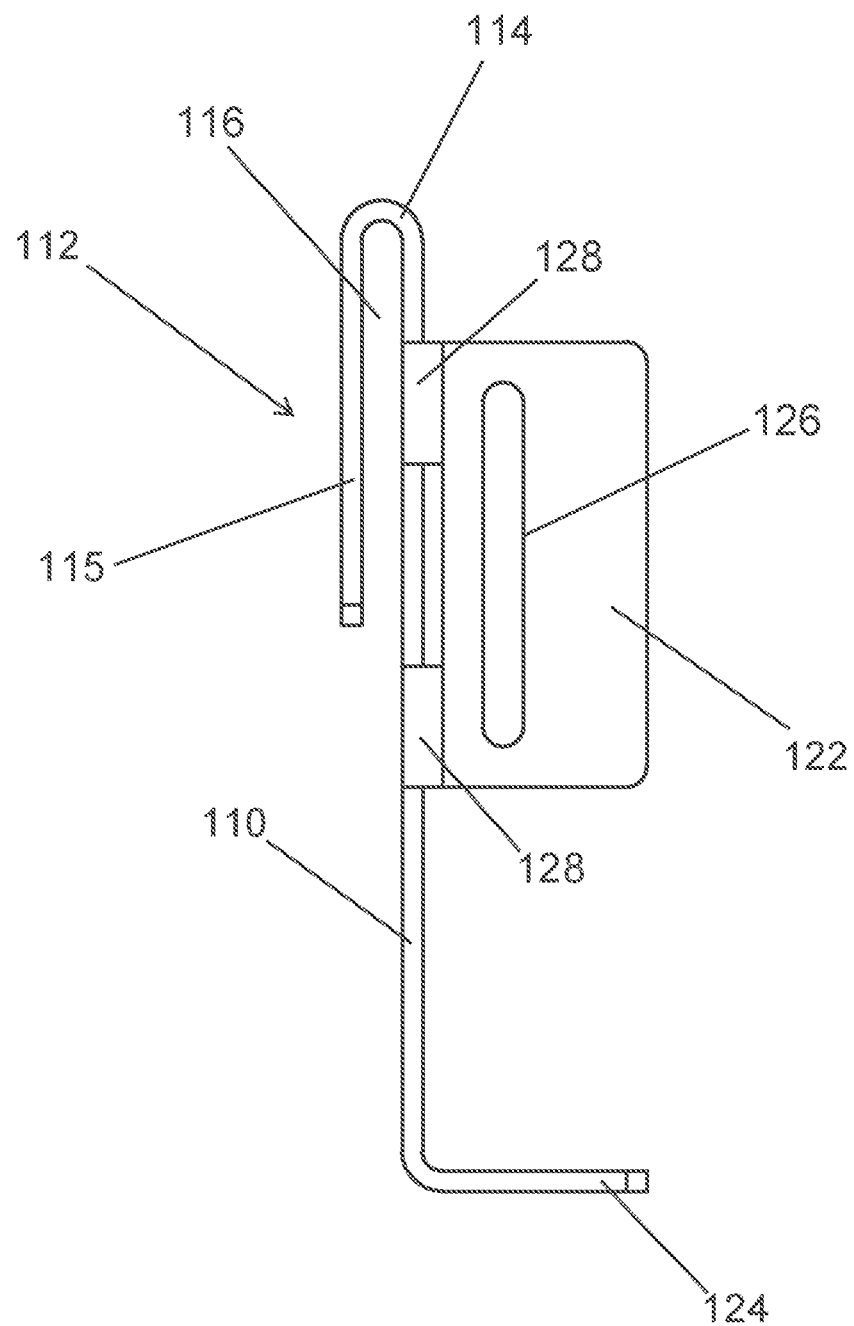
FIG. 17 is a side view of the mounting device of FIG. 15.

Viewing FIG. 16, mounting device 100 comprises two hanging hooks 112 positioned in the corners of the rear side of the main frame 110. While the illustrated embodiment includes two hanging hooks, other embodiments of the mounting device disclosed herein include more than two hanging hooks and/or at least two stability hooks. Each hanging hook 112 extends from the top of main frame 110 and points downward such that they allow the mounting device 100 to hang from fence rungs when it is mounted. As shown in FIG. 17, each hanging hook 112 comprises a flat portion 115 and a curved portion 114 that connects the flat portion 115 to the main frame 110. In this way, curved portions 114 are adjacent to main frame 110 with flat portions 115 extending from curved portions 114. Curved portions 114 may have any shape configured to orient flat portions 115 at an angle of 30 degrees or less relative to main frame 110, preferably an angle of 20 degrees or less. In the illustrated embodiment, curved portions 114 orient flat portions 115 at an angle of 5 degrees or less relative to main frame 110 such that flat portions 115 are generally parallel to main frame 110. A hanging space 116 is defined between the flat portion 115 of each hanging hook 112 and the main frame 110. Hanging spaces 116 are configured to receive fence rungs to allow the mounting device 100 to hang from a fence. To mount the device 100 on a fence, the user simply slides hanging hooks 112 over the desired fence rung, thereby sliding the fence rung into hanging spaces 116 until the fence rung meets the curved portions 114 of the hanging hooks 112. The flat portions 115 of hanging hooks 112 are elongated members. In a preferred embodiment, hanging hooks 112 are approximately 2.75 inches long. Because mounting device 100 does not include stability hooks, hanging hooks 112 are longer than hanging hooks 12 of mounting device 1 in order to provide additional stability against horizontal forces.

Returning to FIGS. 15-16, mounting device 100 comprises a vertical shelf 122 and a horizontal shelf 124 that protrude from main frame 110 in a generally perpendicular forward direction. In this way, shelves 122 and 124 are disposed on an opposite side of the main frame 110 from hanging hooks 112. Each shelf 122, 124 is connected to main frame 110 by curved tabs 128, which are curved to orient shelves 122, 124 in a generally perpendicular direction relative to main frame 110. In the illustrated embodiment, multiple spaced-apart curved tabs 128 connect each shelf 122, 124 to main frame 110. Each shelf 122, 124 comprises at least one slot 126 for attachment of mounting accessories. However, it is to be understood that the shelves 122, 124 in other embodiments may comprise more or fewer rows of slots. Additionally, in the illustrated embodiment, the absence of a top shelf in mounting device 100 allows the use of a taller recording device or other accessory that may above crossbar 121. However, other embodiments of mounting device 100 may include a top shelf and thus allow for the use of a removable cover.

In the illustrated embodiment, shelves 122, 124 and hanging hooks 112 are integrally formed with the main frame 110. For example, main frame 110, shelves 122 and 124, and hanging hooks 112 may have unitary one-piece construction. In some embodiments, main frame 110, shelves 122 and 124, and hanging hooks 112 may be manufactured from a single piece of aluminum, and in certain embodiments a powder-coated aluminum material may be used. The powder coating makes device 100 less conductive of heat, which is beneficial when the device sits in the sun for long periods of time. The aluminum is lightweight, as opposed to conventional mounting devices fabricated from steel. As a result, these embodiments of mounting device 100 are easier to transport and cause less weight strain when hanging from net fences. In other embodiments, shelves 122, 124 and hanging hooks 112 may be integrally formed with the main frame 110 via a permanent attachment during the manufacturing process. For example, device 110 may be manufactured using a molding, casting, extrusion, additive, 3D printing, or welding process or any other process or combination of processes by which shelves 122, 124 and hanging hooks 112 are permanently attached to main frame 110. The integral construction of the shelves and hooks of mounting device 100 provides a more compact design than conventional mounting devices. The integral construction also provides a quicker and more streamlined process for attaching mounting device 100 to a fence than with conventional mounting devices.

Figure 18:
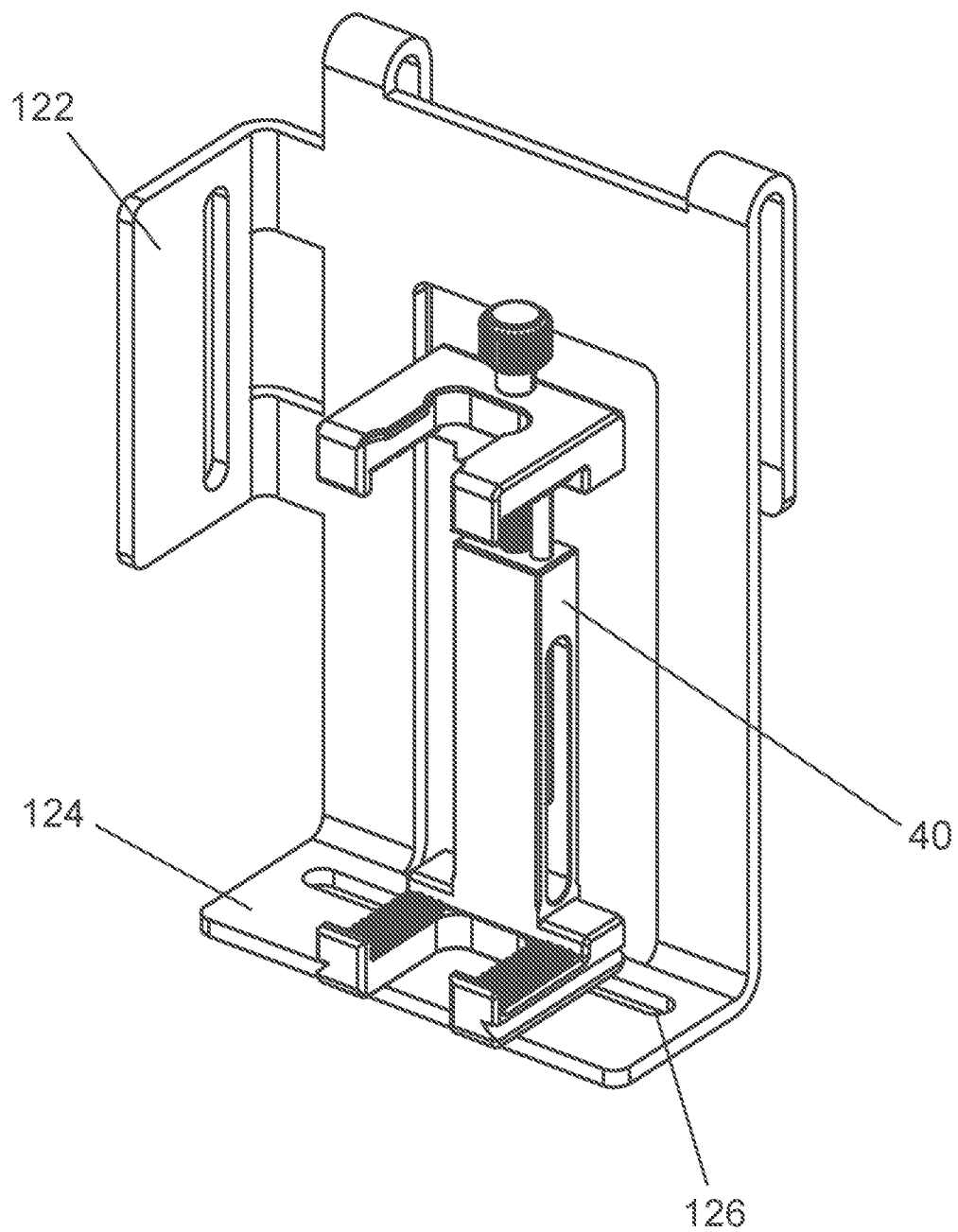
FIG. 18 is a front perspective view of a mounting clamp attached to a horizontal shelf of the mounting device of FIG. 15.
Figure 19:
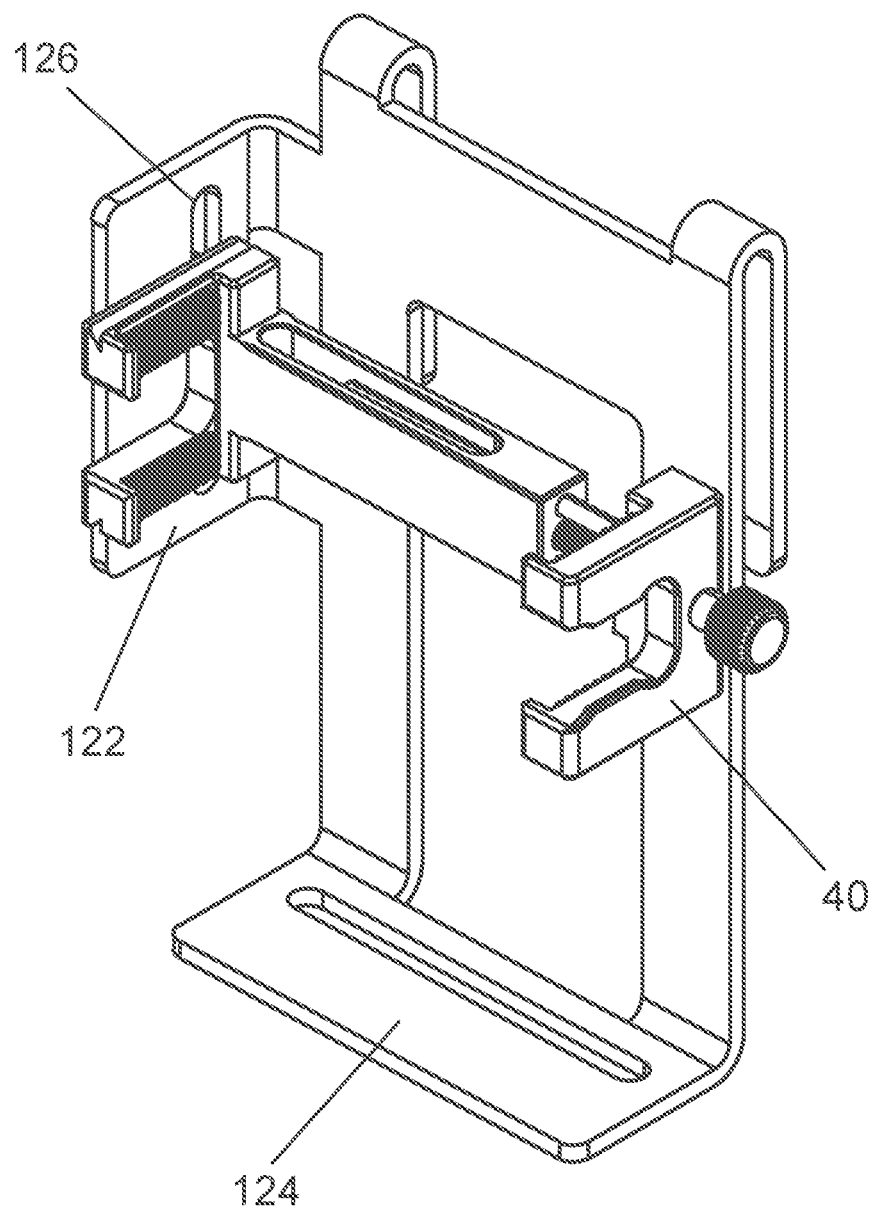
FIG. 19 is a front perspective view of a mounting clamp attached to a vertical shelf of the mounting device of FIG. 15.
Figure 20:
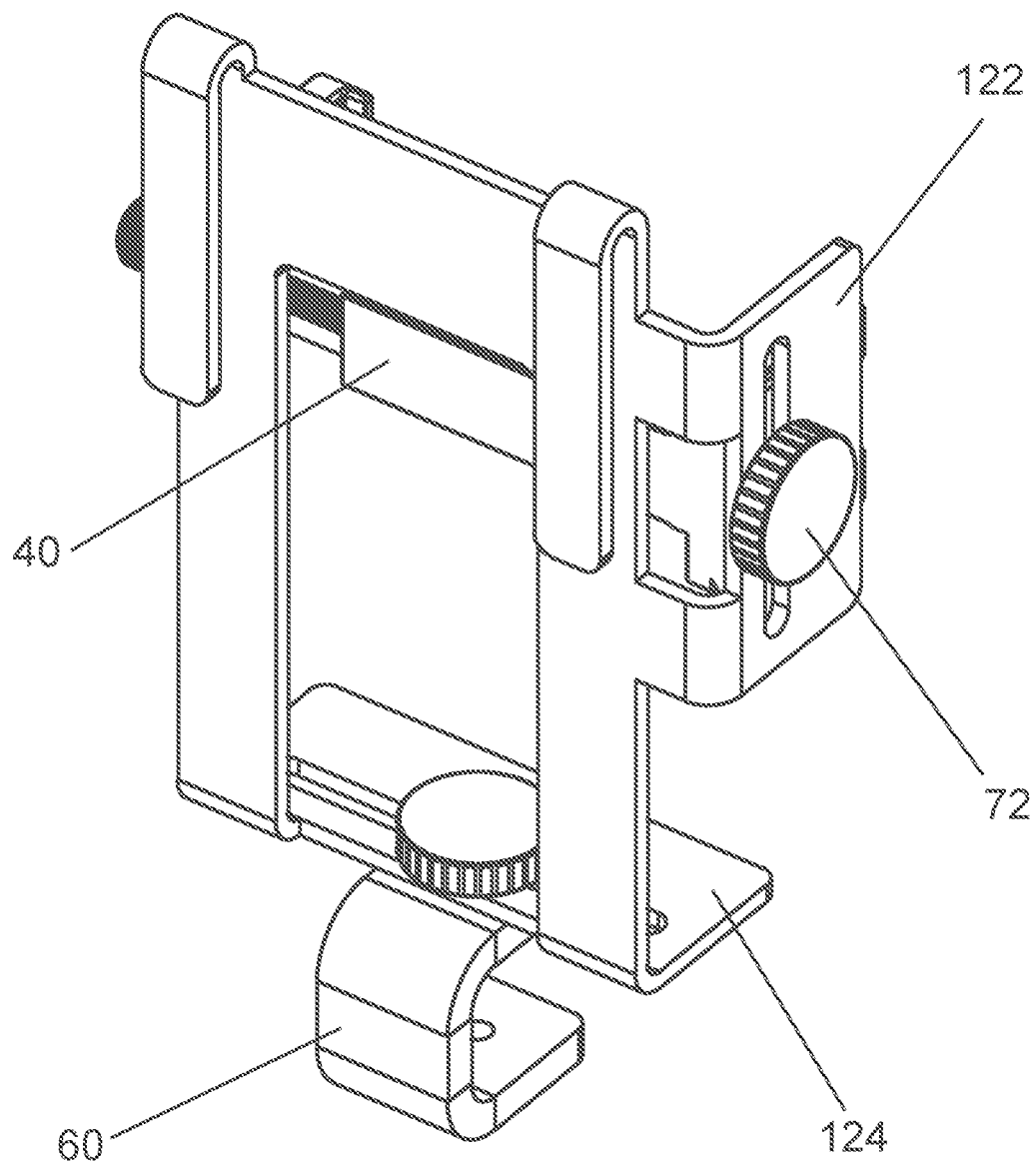
FIG. 20 is a rear perspective view of a mounting clamp attached to the vertical shelf and a tripod adapter attached to the horizontal shelf of the mounting device of FIG. 15.
Figure 21:
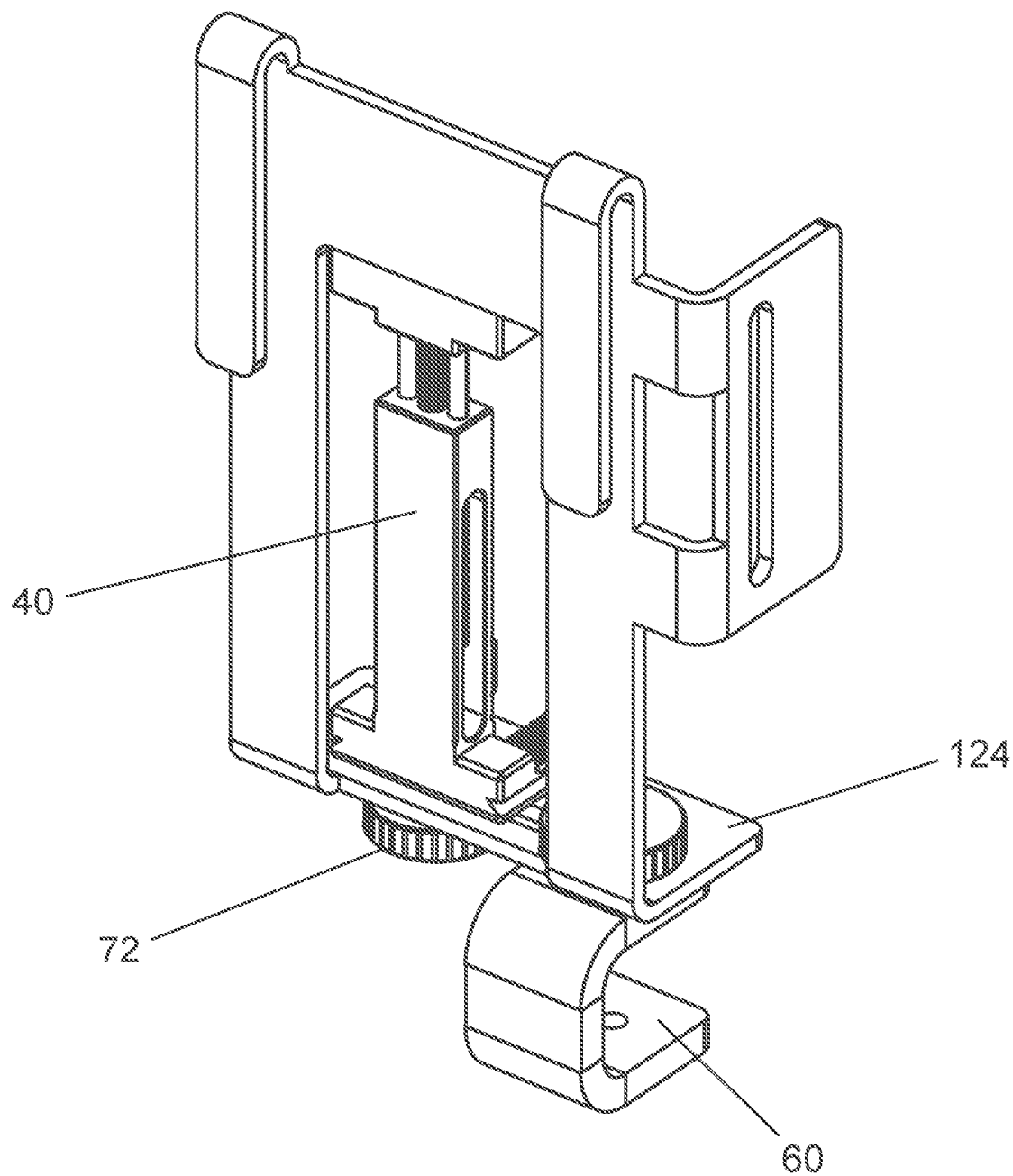
FIG. 21 is a rear perspective view of a mounting clamp and a tripod adapter attached to the horizontal shelf of the mounting device of FIG. 15.

FIGS. 18-21 illustrate exemplary configurations of mounting accessories that can be used to attach various recording and support devices to the mounting device 100. Mounting device 100 is compatible with the same mounting accessories as mounting device 1 and the same method of attachment—i.e., using thumb screw 72 to engage a threaded bore in the bottom of the mounting accessory through slots 126. Turning to FIGS. 18-19, slots 126 on both the horizontal shelf 124 and vertical shelf 122 allow for the attachment of mounting accessories in either orientation. FIG. 18 shows a clamp 40 in position on horizontal shelf 124 to hold a phone for recording in landscape mode, and FIG. 19 shows a clamp 40 in position on vertical shelf 122 to hold a phone for recording in portrait mode. FIGS. 20-21 show configurations that allow multiple mounting accessories to be attached at the same time. In FIG. 20, a clamp 40 is attached to vertical shelf 122 while a tripod adapter 60 is attached to horizontal shelf 124, and in FIG. 21, both a clamp 40 and a tripod adapter 60 are attached to horizontal shelf 124. One skilled in the art will recognize that the slots 126 of the vertical shelf 122 and horizontal shelf 124 allow the mounting device 100 to be used in many different configurations and that the arrangements outlined above are merely demonstrative of the multi-functional capabilities of the mounting device 100. For example, the user could attach an action-cam adapter 50 to horizontal shelf 124, a clamp 40 to the vertical shelf 122 pointing away from mounting device 100 to hold a portable battery, and a tripod adapter to the bottom of horizontal shelf 124 to support mounting device 100 by a tripod.

The foregoing description and accompanying drawings illustrate the principles, exemplary embodiments, and modes of operation of the invention. However, the invention should not be construed as being limited to the particular embodiments discussed above. Many modifications of the embodiments described herein will come to mind to one skilled in the art having the benefit of the teaching presented in the foregoing descriptions and the associated drawings. Accordingly, it should be appreciated that variations to those embodiments can be made by those skilled in the art without departing from the scope of the invention.

What is claimed is:

1. A mounting device configured to secure a recording device to a fence, the mounting device comprising:
   a main frame having a top, a bottom, and a window therebetween;
   a first shelf protruding in a generally perpendicular forward direction from the bottom of the main frame, wherein the first shelf includes at least one slot having a width sufficient to allow the passage of a portion of a mounting accessory;
   at least two hanging hooks protruding from the top of the main frame; wherein each hanging hook has a curved portion and a flat portion, the curved portion adjacent to the main frame and the flat portion extending from the curved portion, wherein a hanging space is defined between the flat portion of each hanging hook and a rear side of the main frame; and
   at least two stability hooks protruding from the bottom of the main frame, wherein each stability hook has a curved portion and a flat portion, the curved portion adjacent to the main frame and the flat portion extending from the curved portion, wherein a stability space is defined between the flat portion of each stability hook and a rear side of the main frame, wherein a length of the flat portion of each stability hook is longer than a length of the flat portion of each hanging hook.

2. The mounting device of claim 1, wherein the hanging hooks and the stability hooks are integrally formed with the main frame.

3. The mounting device of claim 1, wherein the at least one slot is elongated and configured to allow the passage of a portion of two or more mounting accessories.

4. The mounting device of claim 1, wherein the first shelf includes at least two rows of slots.

5. The mounting device of claim 1, further comprising a second shelf protruding in a generally perpendicular forward direction from the top of the main frame, wherein the second shelf comprises at least one slot having a width sufficient to allow the passage of a mounting attachment.

6. The mounting device of claim 5, wherein the second shelf is generally parallel to the first shelf.

7. The mounting device of claim 5, further comprising curved tabs connecting the first shelf and the second shelf to the main frame.

8. The mounting device of claim 5, wherein the first shelf, the second shelf, the hanging hooks, and the stability hooks are all integrally formed with the main frame.

9. The mounting device of claim 8, wherein the main frame, the first shelf, the second shelf, the hanging hooks, and the stability hooks have a unitary one-piece construction.

10. The mounting device of claim 9, wherein the unitary one-piece construction is manufactured from a single piece of powder-coated aluminum.

11. The mounting device of claim 5, comprising a removable cover configured for attachment to the second shelf with a mounting attachment engaged through the at least one slot of the second shelf.

12. The mounting device of claim 1, further comprising at least one removable mounting accessory including a portion configured to be secured in one of the slots of the first shelf; wherein the at least one removable mounting accessory includes a clamp, a camera adapter, or a tripod adaptor.

13. The mounting device of claim 1, wherein the main frame includes a central support bar.

14. A mounting device configured to secure a recording device to a fence, the mounting device comprising:
   a main frame having a top, a bottom, and a window therebetween;
   at least two hanging hooks protruding from the top of the main frame, wherein each hanging hook has a curved portion and a flat portion, the curved portion adjacent to the main frame and the flat portion extending from the curved portion, wherein a hanging space is defined between the flat portion of each hanging hook and a rear side of the main frame;
   a first shelf protruding in a first generally perpendicular forward direction from the bottom of the main frame, wherein the first shelf includes at least one slot having a width sufficient to allow the passage of a portion of a first mounting accessory; and
   a second shelf protruding in a second generally perpendicular forward direction from the main frame, wherein the second shelf is generally perpendicular to the first shelf, wherein the second shelf includes at least one slot having a width sufficient to allow the passage of a portion of a second mounting accessory.

15. The mounting device of claim 14, further comprising curved tabs connecting the first shelf and the second shelf to the main frame.

16. The mounting device of claim 14, wherein the hanging hooks, the first shelf, and the second shelf are integrally formed with the main frame.

17. The mounting device of claim 16, wherein the main frame, the hanging hooks, the first shelf, and the second shelf have a unitary one-piece construction.

18. The mounting device of claim 17, wherein the unitary one-piece construction is manufactured from a single piece of powder-coated aluminum.

19. The mounting device of claim 14, further comprising at least one mounting accessory including a portion configured to be secured in one of the slots of the first shelf or one of the slots of the second shelf, wherein the removable mounting accessory is a clamp, a camera adapter, or a tripod adaptor.

20. A mounting device configured to secure a recording device to a fence, the mounting device comprising:
   a main frame having a top, a bottom, and a window therebetween;
   a first shelf protruding in a generally perpendicular forward direction from the bottom of the main frame, wherein the first shelf is integrally formed with the main frame, wherein the first shelf includes at least one slot having a width sufficient to allow the passage of a portion of a mounting accessory; and
   at least two hanging hooks protruding from the top of the main frame, wherein the hanging hooks are integrally formed with the main frame, wherein each hanging hook has a curved portion and a flat portion, the curved portion adjacent to the main frame and the flat portion extending from the curved portion, wherein a hanging space is defined between the flat portion of each hanging hook and a rear side of the main frame.

21. The mounting device of claim 20, further comprising at least two stability hooks protruding from the bottom of the main frame, wherein the stability hooks are integrally formed with the main frame, wherein each stability hook has a curved portion and a flat portion, the curved portion adjacent to the main frame and the flat portion extending from the curved portion, wherein a stability space is defined between the flat portion of each stability hook and a rear side of the main frame, wherein a length of the flat portion of each stability hook is longer than a length of the flat portion of each hanging hook.

22. The mounting device of claim 20, further comprising a second shelf that is parallel to the first shelf.

23. The mounting device of claim 20, further comprising a second shelf that is perpendicular to the first shelf.

* * * * *